US010242305B2

(12) United States Patent
Kato et al.

(10) Patent No.: US 10,242,305 B2
(45) Date of Patent: *Mar. 26, 2019

(54) CARRIER TAPE, METHOD FOR MANUFACTURING SAME, AND METHOD FOR MANUFACTURING RFID TAG

(71) Applicant: Murata Manufacturing Co., Ltd., Nagaokakyo-shi, Kyoto-fu (JP)

(72) Inventors: Noboru Kato, Nagaokakyo (JP); Kunihiro Komaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,963

(22) Filed: Dec. 21, 2017

(65) Prior Publication Data
US 2018/0114105 A1   Apr. 26, 2018

Related U.S. Application Data

(63) Continuation of application No. 15/281,701, filed on Sep. 30, 2016, now Pat. No. 9,911,079, which is a continuation of application No. PCT/JP2016/064370, filed on May 13, 2016.

(30) Foreign Application Priority Data

Jun. 18, 2015   (JP) ................. 2015-123051

(51) Int. Cl.
*G06K 19/06*   (2006.01)
*G06K 19/077*   (2006.01)
*G06K 19/07*   (2006.01)

(52) U.S. Cl.
CPC ..... *G06K 19/07749* (2013.01); *G06K 19/077* (2013.01); *G06K 19/0715* (2013.01); *G06K 19/0775* (2013.01); *G06K 19/07722* (2013.01); *G06K 19/07754* (2013.01)

(58) Field of Classification Search
CPC .................. H01L 2924/00; H01L 2924/00014
USPC ....... 235/492, 488, 375, 380, 381, 384, 432, 235/487; 257/686, E23.055, E23.124, 257/E23.177; 206/460, 713, 714
See application file for complete search history.

(56) References Cited

PUBLICATIONS

Kato et al., "Carrier Tape, Method for Manufacturing Same, and Method for Manufacturing RFID Tag", U.S. Appl. No. 15/281,701, filed Sep. 30, 2016.

*Primary Examiner* — Jamara Franklin
(74) *Attorney, Agent, or Firm* — Keating & Bennett, LLP

(57) ABSTRACT

A method for manufacturing a carrier tape housing electronic components with seal materials includes preparing a tape-shaped main body with housing holes including bottom surfaces along a longitudinal direction, providing chip-shaped electronic components respectively into the housing holes, affixing a tape-shaped seal material having an adhesive layer on one principal surface to the tape-shaped main body such that the adhesive layer covers the housing holes and adheres to the electronic components, and forming cuts in the tape-shaped seal material to separate portions defining and functioning as the seal materials including portions at least partially overlapping with the respective housing holes in a planar view from the other portions.

10 Claims, 22 Drawing Sheets

CARRIER TAPE, METHOD FOR MANUFACTURING SAME, AND METHOD FOR MANUFACTURING RFID TAG

CROSS REFERENCE TO RELATED APPLICATIONS

This application claims the benefit of priority to Japanese Patent Application 2015-123051 filed on Jun. 18, 2015 and is a Continuation Application of PCT/JP2016/064370 filed on May 13, 2016. The entire contents of each of these applications are hereby incorporated by reference herein.

BACKGROUND OF THE INVENTION

1. Field of the Invention

The present invention relates to a method for manufacturing an RFID (radio frequency identifier) tag, a carrier tape used for manufacturing the RFID tag, and a method for manufacturing the carrier tape.

2. Description of the Related Art

For an article information management system, an RFID system has recently been used and the RFID system allows a reader/writer and an RFID tag applied to an article to communicate in a non-contact manner utilizing a magnetic field or an electromagnetic field so as to transmit predetermined information.

The RFID tag is manufactured by attaching an RFIC element (an RFIC (radio frequency integrated circuit) chip itself or a package equipped with an RFIC chip) to an antenna base material provided with an antenna element. Conventionally known methods for connecting the RFIC element and the antenna element include methods for connection by heating and melting of solder, a conductive adhesive, and other suitable adhesive (see JP No. 2009-87068 A and JP No. 2009-129093 A) and methods for connection by ultrasonic bonding (see JP No. 2012-32931 A and JP No. 2013-45780 A).

However, in the methods for connection by heating and melting of solder, a conductive adhesive, or other suitable adhesive, a connection portion between the RFIC element and the antenna element must be heated to the melting point of the solder, the conductive adhesive, or the other suitable adhesive or higher. In this case, since the antenna base material is required to have high heat resistance, an inexpensive material, such as polyethylene terephthalate (PET) cannot be used for the antenna base material. In the methods for connection by ultrasonic bonding, a bump must be melted ultrasonically. This leads to problems such as a long time required for completing the ultrasonic bonding, and changes in the quality and the shape of polyethylene terephthalate (PET) that is the antenna base material at the temperature at which the bump melts.

If the antenna base material has flexibility, the RFID tag can be affixed to a member having a curved surface or a flexible material. However, the conventional methods for connection as described above may cause stress to concentrate on a connection portion between the RFID element and the antenna element and the connection portion may be damaged or destroyed. Therefore, a new method is desired for connecting an electronic component, such as the RFIC element, and a connection object, such as the antenna element.

SUMMARY OF THE INVENTION

Preferred embodiments of the present invention provide a carrier tape, a method for manufacturing the same, and a method for manufacturing an RFID tag capable of improving the handleability of a component used in a method for connecting an electronic component and a connection object.

A method for manufacturing a carrier tape according to a preferred embodiment of the present invention is a method for manufacturing a carrier tape that houses a plurality of electronic components with seal materials, the method including the steps of preparing a tape-shaped main body including a plurality of housing holes including bottom surfaces along a longitudinal direction; providing chip-shaped electronic components respectively in the plurality of the housing holes; affixing a tape-shaped seal material including an adhesive layer on one principal surface to the tape-shaped main body, such that the adhesive layer covers the housing holes and adheres to the electronic components; and forming cuts in the tape-shaped seal material to separate portions defining and functioning as the seal materials including portions at least partially overlapping with the respective housing holes in a planar view from the other portions.

A carrier tape according to a preferred embodiment of the present invention is a carrier tape that houses a plurality of electronic components with seal materials, including a tape-shaped main body that includes a plurality of housing holes including bottom surfaces along a longitudinal direction; a plurality of chip-shaped electronic components respectively housed in the plurality of the housing holes; and a plurality of seal materials including an adhesive layer on one principal surface and affixed to the tape-shaped main body, such that the adhesive layer covers the housing holes and adheres to the electronic components.

A method for manufacturing an RFID tag according to a preferred embodiment of the present invention includes the steps of preparing a carrier tape housing a plurality of RFIC elements with seal materials, the carrier tape including a tape-shaped main body that includes a plurality of housing holes including bottom surfaces along a longitudinal direction, a plurality of chip-shaped RFIC elements respectively housed in the plurality of the housing holes, and a plurality of seal materials including an adhesive layer on one principal surface and affixed to the tape-shaped main body, such that the adhesive layer covers the housing holes and adheres to the RFIC elements; folding the tape-shaped main body to separate each of the RFIC elements with seal materials from the tape-shaped main body; and affixing the separated RFIC element with a seal material to an antenna base material by the adhesive layer of the seal material.

Various preferred embodiments of the present invention improve the handleability of a component used in a method for connecting an electronic component and a connection object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
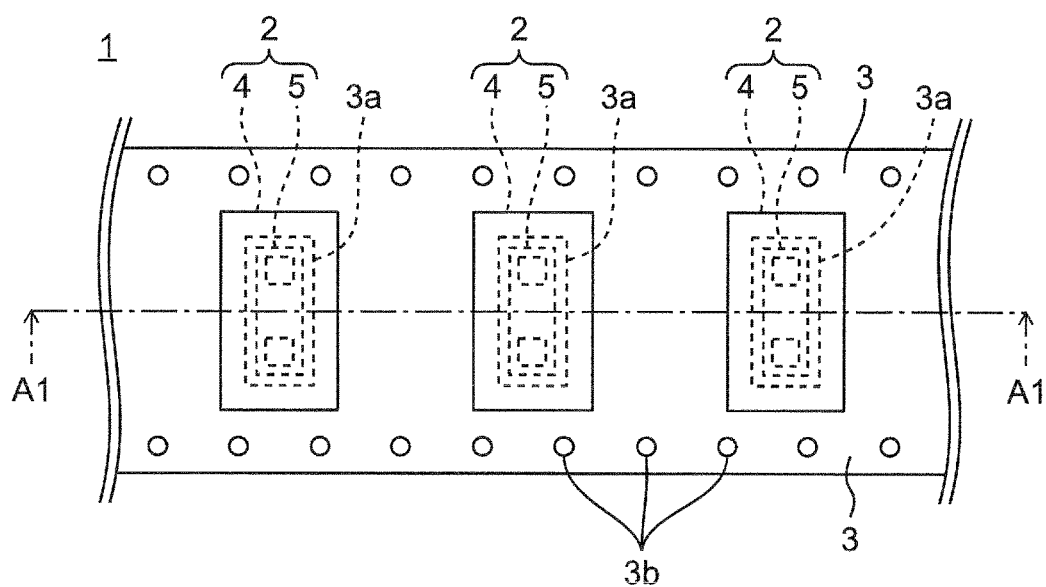
FIG. 1 is a plan view of a general configuration of a carrier tape according to a first preferred embodiment of the present invention.

As described above, a new connection method is needed for connecting an electronic component, such as an RFIC element, and a connection object, such as an antenna element. Therefore, the present applicant is making progress in the development of an electronic component with a seal material acquired by affixing the electronic component to an adhesive layer on one principal surface of the seal material. This electronic component with a seal material is used in such a manner that the seal material is affixed by the adhesive layer to the connection object so as to bring a terminal electrode on the electronic component into contact with the connection object.

In this case, the terminal electrode of the electronic component is able to be brought into contact with the connection object to retain electrical contact between the terminal electrode of the electronic component and the connection object. Additionally, the connection between the electronic component and the connection object is able to be maintained by affixing the seal material to the connection object, and this eliminates the need for direct ultrasonic fixation or fixation using a bonding material between the terminal electrode of the electronic component and the connection object.

Therefore, even when the connection object is bent, a stress is prevented from concentrating on a connection portion between the electronic component and the connection object, and the connection portion is prevented from being damaged or destroyed.

As a result of intensive research for improving the handleability of the electronic component with a seal that is a component used in the new method for connection described above, the following preferred embodiments of the present invention were conceived and developed by the present applicant.

A method for manufacturing a carrier tape according to a preferred embodiment of the present invention is a method for manufacturing a carrier tape that houses a plurality of electronic components with seal materials, the method including the steps of preparing a tape-shaped main body that includes a plurality of housing holes including bottom surfaces along a longitudinal direction; providing chip-shaped electronic components respectively into the plurality of the housing holes; affixing a tape-shaped seal material including an adhesive layer on one principal surface to the tape-shaped main body such that the adhesive layer covers the housing holes and adheres to the electronic components; and forming cuts in the tape-shaped seal material to separate portions defining and functioning as the seal materials including portions at least partially overlapping with the respective housing holes in a planar view from the other portions.

According to this method for manufacturing, the plurality of the electronic components with seal materials is housed in the carrier tape and, therefore, the handleability of the plurality of the electronic components with seal materials is improved. Additionally, since the seal materials necessary for manufacturing RFID tags are affixed to the tape-shaped main body in order to retain the electronic components, it is not necessary to provide another member that is unnecessary for manufacturing RFID tags in order to retain the electronic components in the housing holes. Therefore, the number of manufacturing steps and the manufacturing costs are reduced.

The depth of the housing holes may preferably be the same or substantially the same as the thickness of the electronic components or less than the thickness of the electronic components. In this case, the seal materials and the electronic components are ensured to be brought into contact with each other, and the seal materials and the electronic components are able to be more securely bonded through the adhesive layer.

A method for manufacturing a carrier tape according to a preferred embodiment of the present invention may preferably further include a step of separating the portions other than those defining and functioning as the seal materials from the tape-shaped main body after the cuts are formed in the tape-shaped seal material.

According to this method for manufacturing, when the electronic components with seal materials are separated from the tape-shaped main body, the electronic components with seal materials are separated after the portions other than those defining and functioning as the seal materials are removed, and therefore are more easily separated.

The electronic components may each preferably include a pair of terminal electrodes on a surface on the side opposite to a fixation surface fixed to the adhesive layer of the seal material.

Preferably, the electronic components may each include a pair of terminal electrodes and may each be fixed through the pair of the terminal electrodes to the adhesive layer of the seal material.

A carrier tape according to a preferred embodiment to the present invention includes a tape-shaped main body including a plurality of housing holes including bottom surfaces along a longitudinal direction; a plurality of chip-shaped electronic components respectively housed in the plurality of the housing holes; and a plurality of seal materials including an adhesive layer on one principal surface and affixed to the tape-shaped main body such that the adhesive layer covers the housing holes and adheres to the electronic components.

According to this carrier tape, the plurality of the electronic components with seal materials is housed in the carrier tape and, therefore, the handleability of the plurality of the electronic components with seal materials is improved. Additionally, since the seal materials necessary for manufacturing RFID tags are affixed to the tape-shaped main body to retain the electronic components, it is not necessary to provide another member that is unnecessary for manufacturing RFID tags to retain the electronic components in the housing holes. Therefore, the number manufacturing steps and the manufacturing costs are reduced.

Preferably, the seal materials have a higher rigidity than the tape-shaped main body. As a result, when the tape-shaped main body is folded, the separation of the seal materials from the tape-shaped main body is facilitated.

The electronic components may preferably be components that define RFID tags and may each include an RFIC chip and a substrate equipped with the RFIC chip.

The substrate may preferably be a substrate that defines a RFID tag and may include a power feeding circuit to provide impedance matching between an antenna element and the RFIC chip.

Preferably, the electronic components may each include a pair of terminal electrodes and may each be fixed through the pair of the terminal electrodes to the adhesive layer of the seal material.

A method for manufacturing an RFID tag according to a preferred embodiment of the present invention includes the steps of preparing a carrier tape housing a plurality of RFIC elements with seal materials, the carrier tape including a tape-shaped main body that includes a plurality of housing holes including bottom surfaces along a longitudinal direction, a plurality of chip-shaped RFIC elements respectively housed in the plurality of the housing holes, and a plurality of seal materials including an adhesive layer on one principal surface and affixed to the tape-shaped main body such that the adhesive layer covers the housing holes and adheres to the RFIC elements; folding the tape-shaped main body to separate each of the RFIC elements with seal materials from the tape-shaped main body; and affixing the separated RFIC element with a seal material to an antenna base material by the adhesive layer of the seal material.

According to this method for manufacturing, the RFIC elements with seal materials are the plurality of the electronic components with seal materials and are housed in the carrier tape and, therefore, the handleability of the plurality of the RFIC elements with seal materials is improved. Additionally, since the seal materials necessary for manufacturing the RFID tags are affixed to the tape-shaped main body to retain the RFIC elements, it is not necessary to provide another member that is unnecessary for manufacturing the RFID tags to retain the RFIC elements in the housing holes. Moreover, since the electronic components with seal materials are separated from the tape-shaped main body by simply folding the tape-shaped main body, the number manufacturing steps and the manufacturing costs are reduced.

The carrier tape may preferably be wound around a supply reel, and while the carrier tape is continuously pulled out from the supply reel, the tape-shaped main body of the pulled-out carrier tape may be folded at a certain position away from the supply reel to sequentially separate the plurality of the RFIC elements with seal materials from the tape-shaped main body.

According to this method for manufacturing, the plurality of the RFIC elements are able to be separated from the tape-shaped main body at high speed. Consequently, a plurality of RFID tags are able to be manufactured in a shorter amount of time.

Preferably, the seal materials have a shape (e.g., a rectangular or substantially rectangular shape) having a longitudinal direction and a transverse direction in a planar view and, when each of the RFIC elements with seal materials is separated from the tape-shaped main body, a portion in the longitudinal direction of the seal material is first separated. As a result, the RFIC elements with seal materials are more easily separated from the tape-shaped main body.

Preferably, the RFIC elements each include a pair of terminal electrodes and may be each fixed through the pair of the terminal electrodes to the adhesive layer of the seal material, and when the RFIC elements with seal materials are each affixed to the antenna base material by the adhesive layer of the seal material, a portion of each of the pair of the terminal electrodes may be connected to an antenna conductor provided on the antenna base material.

Preferred embodiments of the present invention will now be described with reference to the drawings.

First Preferred Embodiment

Figure 2:
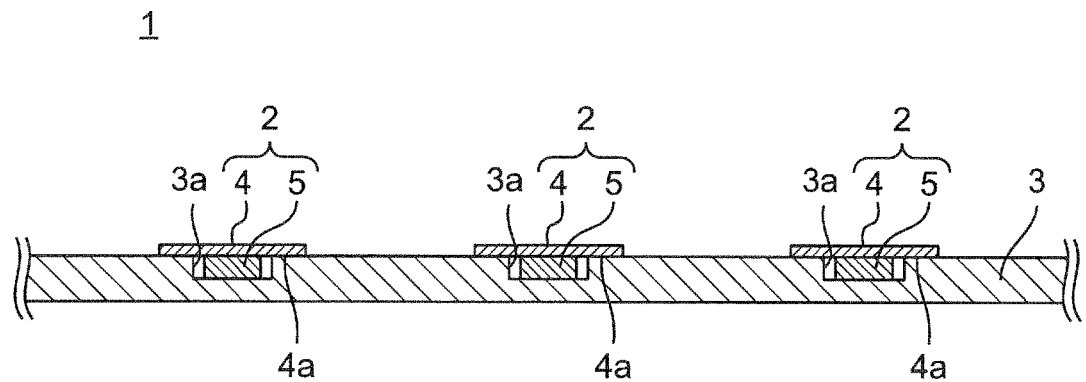
FIG. 2 is a cross-sectional view taken along a line A1-A1 of FIG. 1.
Figure 3:
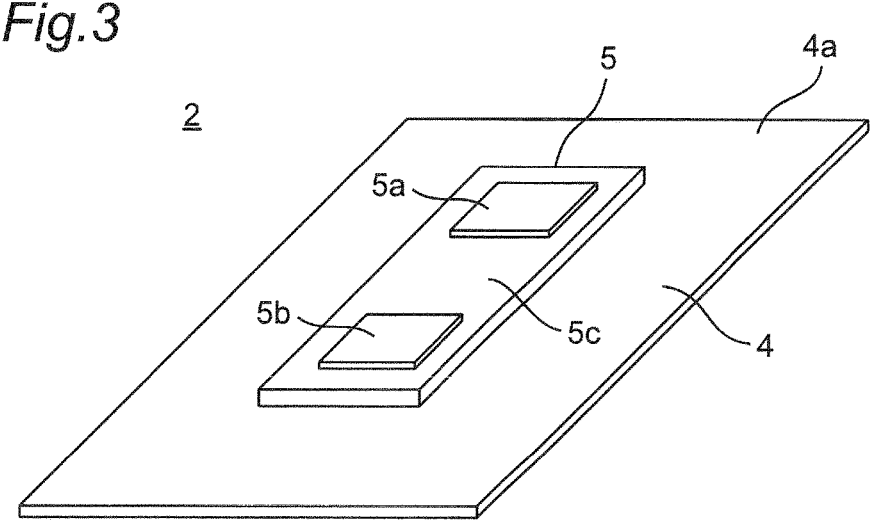
FIG. 3 is a perspective view of a general configuration of an electronic component with a seal material.

FIG. 1 is a plan view of a general configuration of a carrier tape according to a first preferred embodiment of the present invention. FIG. 2 is a cross-sectional view taken along a line A1-A1 of FIG. 1. FIG. 3 is a perspective view of a general configuration of an electronic component with a seal material.

As shown in FIG. 1 or 2, a carrier tape 1 according to the first preferred embodiment is configured to house a plurality of electronic components 2 with seal materials. More specifically, the carrier tape 1 includes a tape-shaped main body 3, a plurality of seal materials 4, and a plurality of chip-shaped electronic components 5.

The tape-shaped main body 3 is preferably a belt-shaped member, for example, that includes a plurality of housing holes 3a including bottom surfaces on one principal surface. The plurality of the housing holes 3a is disposed along the longitudinal direction of the tape-shaped main body 3. The arrangement intervals of the housing holes 3a are preferably equal or substantially equal intervals, for example. The housing holes 3a preferably have a size that is slightly larger than the electronic components 5 so that the electronic components 5 are entirely housed in a planar view while a gap of about 0.1 mm to about 2 mm, for example, is provided around the electronic components 5. The "planar view" refers to a view in the direction shown in FIG. 1. The tape-shaped main body 3 preferably includes a member having flexibility, such as polyethylene terephthalate (PET) and paper, for example. The thickness of the tape-shaped main body 3 is preferably about 50 µm to about 800 µm, for example. In the first preferred embodiment, the depth of the housing holes 3a is preferably equal or substantially equal to the thickness of the electronic components 5. Both end portions in the width direction of the tape-shaped main body 3 are preferably provided with a plurality of feed holes 3d along the longitudinal direction of the tape-shaped main body 3. Suction holes may be provided for temporarily sucking and fixing the electronic components 5 until the electronic components are fixed by the seal materials 4 after disposing the electronic components 5 in the bottom portions of the housing holes 3a.

The seal materials 4 are each affixed to, for example, an antenna base material 11 described later to retain an electrical connection between an antenna element 12, that is an example of a connection object, and the electronic component 5. Each of the seal materials 4 includes an adhesive layer 4a on one principal surface thereof. The adhesive layer 4a is preferably provided on the entire or substantially the entire one principal surface of the seal material 4, for example. The seal materials 4 are affixed to one principal surface of the tape-shaped main body 3 such that the adhesive layers 4a are exposed in the housing holes 3a. The one principal surface of the tape-shaped main body 3 is subjected to a release treatment. In the first preferred embodiment, the seal materials 4 preferably have a size larger than the housing holes 3a so as to completely cover the housing holes 3a. The seal materials 4 preferably include members having flexibility and elasticity, such as polyethylene, polypropylene, polyvinyl butyral (PVB), and paper, for example. The thickness of the seal materials 4 is preferably about 20 μm to about 200 μm, for example.

The electronic components 5 are housed in the housing holes 3a and bonded to the adhesive layers 4a of the seal materials 4. In the first preferred embodiment, the electronic components 5 are preferably RFIC elements (packages or straps with RFIC chips sealed therein), for example. As shown in FIG. 3, each of the electronic components 5 includes a first terminal electrode 5a and a second terminal electrode 5b on a surface on the side opposite to a fixation surface fixed to the adhesive layer 4a of the seal material 4. The first terminal electrode 5a and the second terminal electrode 5b are provided on a substrate 5c including an RFIC chip. The substrate 5c is preferably made of a flexible material, such as a liquid crystal polymer resin or a polyimide resin, for example. The height (thickness) of the electronic components 5 is preferably about 50 μm to about 1 mm, for example.

In the carrier tape according to the first preferred embodiment, the plurality of the electronic components 2 with seal materials is housed in the carrier tape 1 and, therefore, the handleability of the plurality of the electronic components 2 with seal materials is improved. Additionally, since the seal materials 4 necessary for manufacturing RFID tags are affixed to the tape-shaped main body 3 to retain the electronic components 5, it is not necessary to provide another member that is unnecessary for manufacturing RFID tags to retain the electronic components 5 in the housing holes 3a. Therefore, the number of manufacturing steps and the manufacturing costs are reduced.

Although the electronic components 5 are preferably RFIC elements in the first preferred embodiment, this is not a limitation of the present invention. If the electronic components 2 with seal materials are used for a purpose other than manufacturing of RFID tags, the electronic components 5 may be components other than the RFIC elements. For example, the electronic components 5 may be sensor components, such as temperature sensors and acceleration sensors. In this case, a plurality of sensor components with seal materials may be housed in a carrier tape, and the carrier tape may be used to affix the sensor components with seal materials to articles that are an example of the connection object such as a carrying case. As a result, the plurality of the sensor components are able to be mounted on articles at high speed.

Although the adhesive layer 4a is provided on the one entire principal surface of the seal material 4 in the first preferred embodiment, this is not a limitation of the present invention. The adhesive layer 4a may be dispersedly or intermittently disposed at necessary positions on the one principal surface of the seal material 4.

A method for manufacturing a carrier tape according to the first preferred embodiment will be described. FIGS. 4A to 4E are cross-sectional views of an example of the method for manufacturing a carrier tape according to the first preferred embodiment.

Figure 4A:
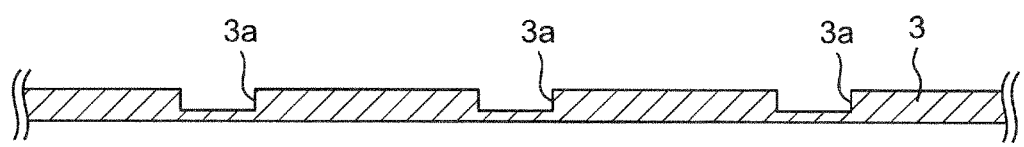
FIG. 4A is a cross-sectional view of an example of a method for manufacturing the carrier tape of FIG. 1.

First, as shown in FIG. 4A, the belt-shaped tape-shaped main body 3 including a plurality of the housing holes 3a along a longitudinal direction is prepared.

Figure 4B:
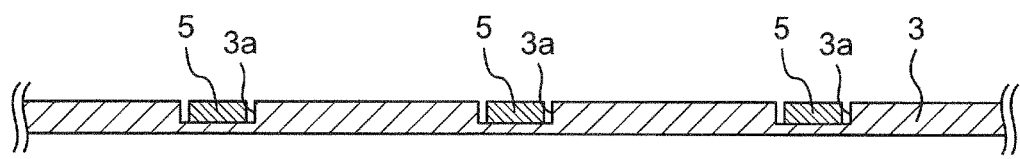
FIG. 4B is a cross-sectional view of a step continued from FIG. 4A.

As shown in FIG. 4B, the electronic components 5 are respectively housed into the plurality of the housing holes 3a of the tape-shaped main body 3.

Figure 4C:
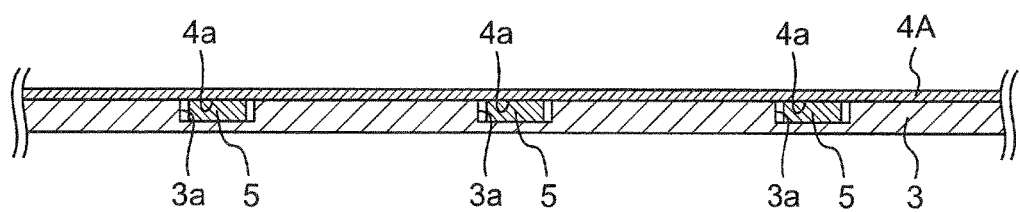
FIG. 4C is a cross-sectional view of a step continued from FIG. 4B.

As shown in FIG. 4C, a tape-shaped seal material 4A including the adhesive layer 4a on one principal surface is affixed to the tape-shaped main body 3, such that the adhesive layer 4a covers the housing holes 3a and adheres to the electronic components 5.

Figure 4D:
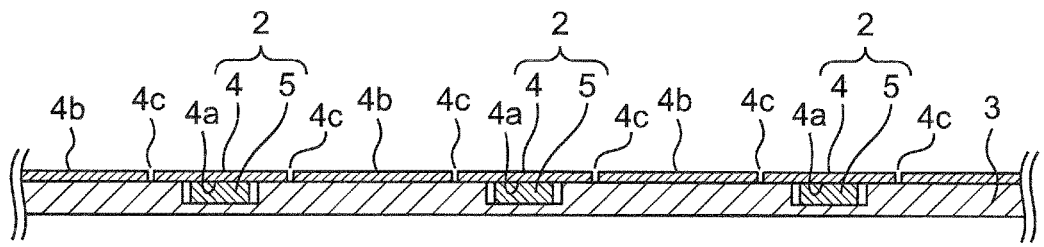
FIG. 4D is a cross-sectional view of a step continued from FIG. 4C.

As shown in FIG. 4D, cuts 4c are provided in the tape-shaped seal material 4A to separate portions defining and functioning as the seal materials 4 including portions overlapping with the respective housing holes 3a in a planar view from the other portions 4b. In this case, the cuts 4c are provided to penetrate the tape-shaped seal material 4A from one principal surface to the other principal surface.

Figure 4E:
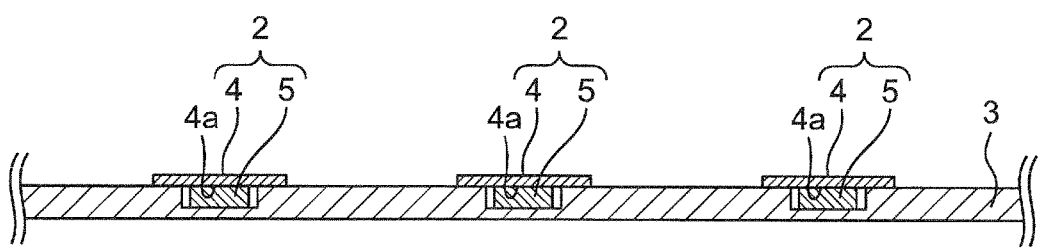
FIG. 4E is a cross-sectional view of a step continued from FIG. 4D.

As shown in FIG. 4E, the other portions 4b are separated from the tape-shaped main body 3. The other portions 4b are connected in the longitudinal direction of the tape-shaped seal material 4A and therefore are able to be sequentially peeled off from the tape-shaped main body 3.

According to the method for manufacturing a carrier tape according to the first preferred embodiment, the plurality of the electronic components 2 with seal materials is housed in the carrier tape 1 and, therefore, the handleability of the plurality of the electronic components 2 with seal materials is improved. Additionally, since the seal materials 4 necessary for manufacturing RFID tags are affixed to the tape-shaped main body 3 to retain the electronic components 5, it is not necessary to provide another member that is unnecessary for manufacturing RFID tags to retain the electronic components 5 in the housing holes 3a. Therefore, the number of manufacturing steps and the manufacturing costs are reduced.

In the method for manufacturing a carrier tape according to the first preferred embodiment, the cuts 4c are formed in the tape-shaped seal material 4A before separating the portions 4b other than those defining and functioning as the seal materials 4 from the tape-shaped main body 3. As a result, when the electronic components 2 with seal materials are separated from the tape-shaped main body 3, the electronic components 2 with seal materials are separated after the portions 4b other than those defining and functioning as the seal materials 4 are removed, and therefore, are able to be easily separated.

Although after the cuts 4c are formed in the tape-shaped seal material 4A, the portions 4b other than those defining and functioning as the seal materials 4 are separated from the tape-shaped main body 3 in the first preferred embodiment, this is not a limitation of the present invention. The adhesion between the other portions 4b and the tape-shaped main body 3, the size of the cuts 4c, and other factors may be adjusted such that when the electronic components 2 with seal materials are separated from the tape-shaped main body 3, the separation is not prevented by the portions 4b other than those defining and functioning as the seal materials 4. This eliminates the need to separate the other portions 4b from the tape-shaped main body 3.

Figure 5:
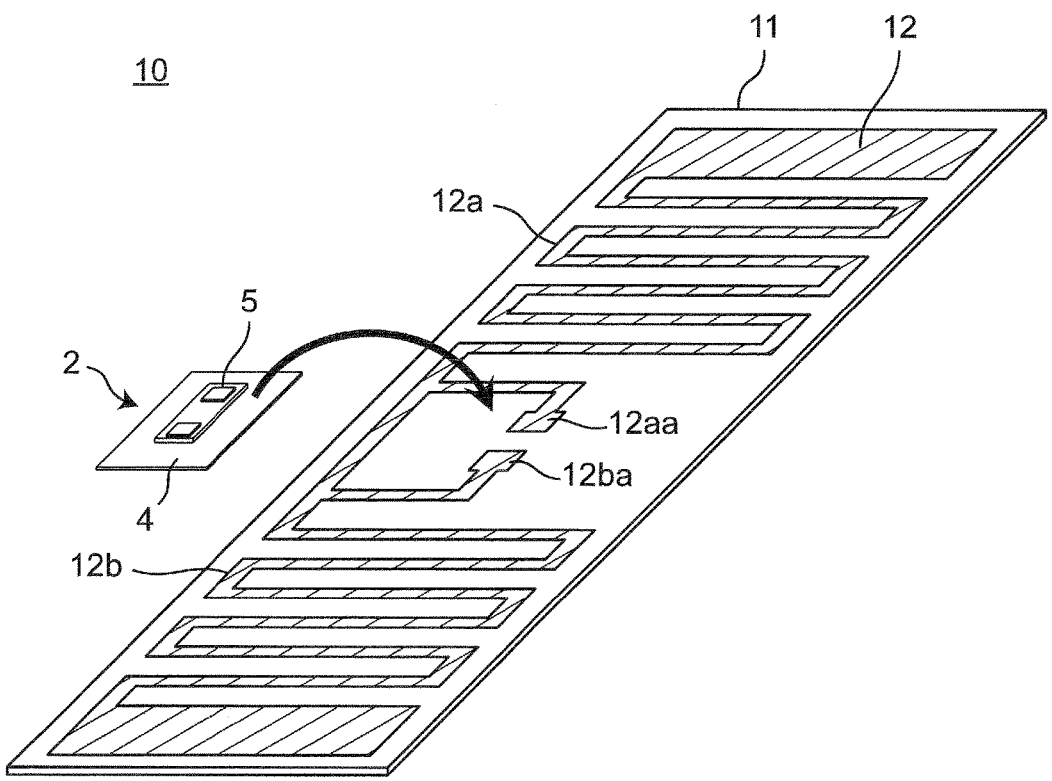
FIG. 5 is a perspective view of a method for manufacturing an RFID tag according to a preferred embodiment of the present invention.
Figure 6:
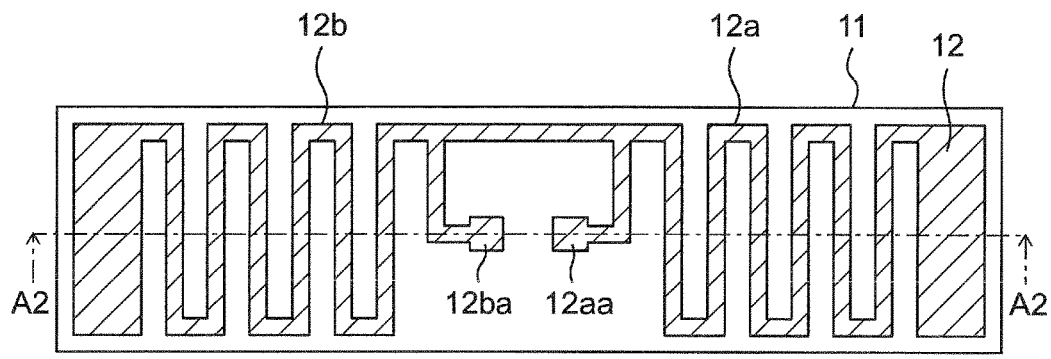
FIG. 6 is a plan view of an antenna element and an antenna base material.
Figure 7:
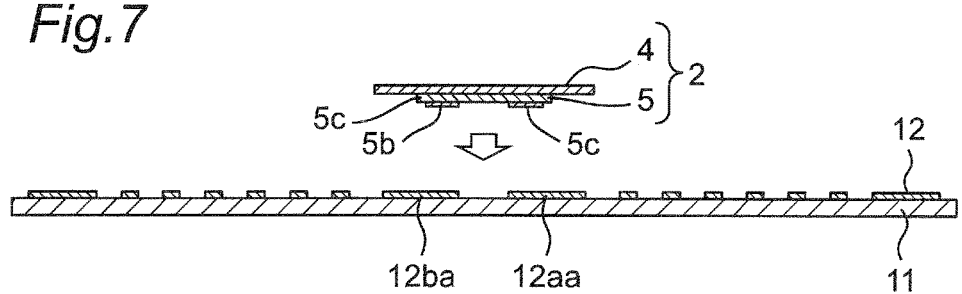
FIG. 7 is a cross-sectional view taken along a line A2-A2 of FIG. 6.
Figure 8:
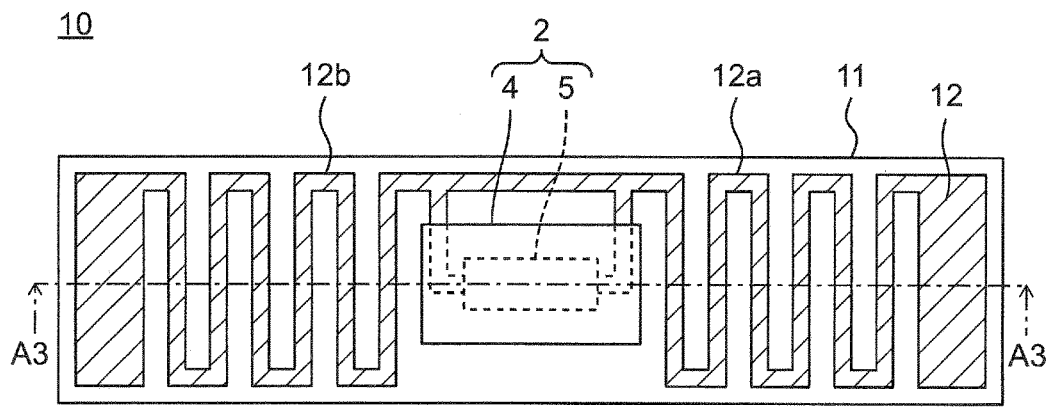
FIG. 8 is a plan view of a state in which the electronic component with a seal material is attached onto the antenna element.
Figure 9:
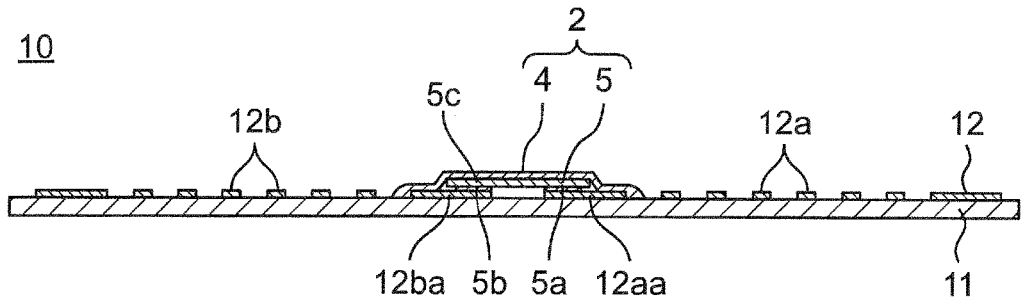
FIG. 9 is a cross-sectional view taken along a line A3-A3 of FIG. 8.

A method for manufacturing an RFID tag 10 according to a preferred embodiment of the present invention using the electronic component 2 with a seal material (RFIC element 2 with a seal material) will be described. FIG. 5 is a perspective view of the method for manufacturing the RFID tag 10. FIG. 6 is a plan view of the antenna base material 11 and the antenna element 12 that are components of the RFID tag 10. FIG. 7 is a cross-sectional view taken along a line A2-A2 of FIG. 6. FIG. 8 is a plan view of a state in which the electronic component 2 with a seal material is attached onto the antenna element 12. FIG. 9 is a cross-sectional view taken along a line A3-A3 of FIG. 8.

As shown in FIGS. 5 to 9, the RFID tag 10 is manufactured by attaching the electronic component 2 with a seal material to the antenna element 12 on one principal surface of the antenna base material 11. The RFID tag 10 is, for example, an RFID tag using the 900 MHz band as a communication frequency.

The antenna base material 11 preferably includes a flexible material, such as polyethylene terephthalate (PET) and paper, for example. One principal surface of the antenna base material 11 is provided with the antenna element 12 made of copper foil or aluminum foil.

The antenna element 12 preferably has a meandering shape, for example, and includes antenna conductors 12a, 12b defining and functioning as a dipole antenna. A first end portion 12aa and a second end portion 12ba are an end portion of the antenna conductor 12a and an end portion of the antenna conductor 12b, respectively, and are arranged so as to be spaced away from each other. An interval between the first end portion 12aa and the second end portion 12ba is identical or substantially identical to an interval between the first terminal electrode 5a and the second terminal electrode 5b of the electronic component (RFIC element) 5.

The seal material 4 of the electronic component 2 with a seal material is affixed by the adhesive layer 4a to the antenna base material 11 such that the first end portion 12aa and the second end portion 12ba are brought into contact with the first terminal electrode 5a and the second terminal electrode 5b, respectively. As a result, the RFID tag 10 is completed.

In this case, the first end portion 12aa and the first terminal electrode 5a as well as the second end portion 12ba and the second terminal electrode 5b are not directly fixed to each other but are electrically connected to each other. Therefore, even when the antenna base material 11 is bent, the first end portion 12aa and the first terminal electrode 5a as well as the second end portion 12ba and the second terminal electrode 5b slide at respective connection portions and, therefore, no stress concentrates on the connection portions. Thus, degradation in the reliability of the connection is effectively reduced or prevented between the electronic component 2 with a seal material and the antenna element 12.

Although the antenna conductors 12a, 12b preferably have a meandering shape in the first preferred embodiment, this is not a limitation of the present invention. The antenna conductors 12a, 12b may have, for example, a rectangular or substantially rectangular belt shape or other suitable shapes. Although the antenna conductors 12a, 12b define and function as a dipole antenna, this is not a limitation of the present invention. The antenna conductors 12a, 12b may define and function as a loop type antenna or may define and function as other suitable types of antennas.

Figure 10:
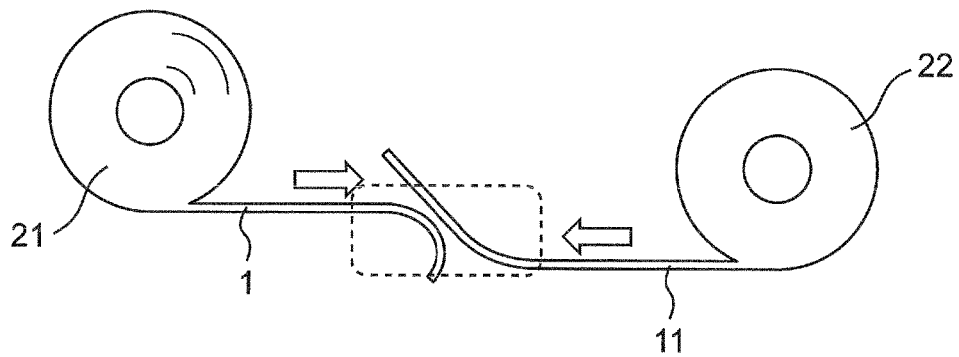
FIG. 10 is a side view of an example of a method for manufacturing a plurality of RFID tags according to a preferred embodiment of the present invention using the carrier tape of FIG. 1.
Figure 11:
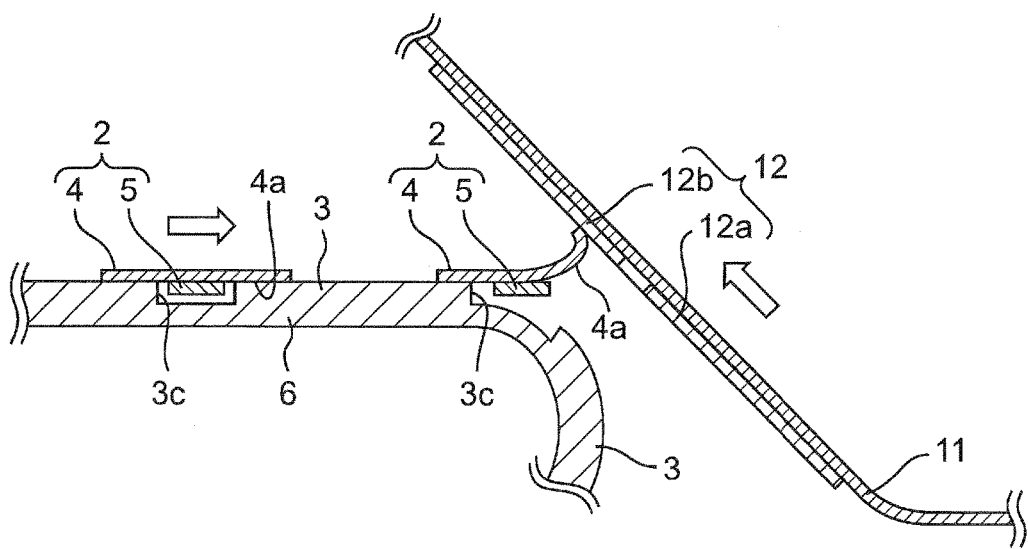
FIG. 11 is an enlarged cross-sectional view of a portion surrounded by a dotted line of FIG. 10.

A method for manufacturing a plurality of the RFID tags 10 according to a preferred embodiment of the present invention using the carrier tape 1 will be described. FIG. 10 is a side view of an example of the method for manufacturing a plurality of the RFID tags 10 using the carrier tape 1. FIG. 11 is an enlarged cross-sectional view of a portion surrounded by a dotted line of FIG. 10.

First, as shown in FIG. 10, a supply reel 21 is prepared with the carrier tape 1 wound therearound. A plurality of the antenna base materials 11 including the antenna elements 12 provided thereon as shown in FIG. 6 is connected in series and formed into a tape shape such that the sides in the transverse direction are connected to each other, and a supply reel 22 is prepared with the plurality of the antenna base materials 11 wound therearound.

The carrier tape 1 is continuously pulled out from the supply reel 21 while pulling out the antenna base materials 11 including the antenna elements 12 thereon from the supply reel 22, and the carrier tape 1 and the antenna base materials 11 are brought into close proximity to each other.

As shown in FIG. 11, the tape-shaped main body 3 of the carrier tape 1 is folded (bent) in the vicinity of the antenna base materials 11 to separate the electronic component 2 with a seal material from the tape-shaped main body 3. At the time of separation, while the electronic component 2 with a seal material is being separated from the tape-shaped main body 3, the electronic component 2 with a seal material is affixed to the antenna conductors 12a, 12b of the antenna element 12 transported in the direction intersecting with the transport direction of the carrier tape 1.

More specifically, by folding the tape-shaped main body 3 of the carrier tape 1 in the vicinity of the antenna base materials 11, one end portion of the seal material 4 first peels off from the tape-shaped main body 3. The one end portion of the seal material 4 adheres by the adhesive force of the adhesive layer 4a to the antenna conductor 12b of the antenna element 12 transported in the direction intersecting with the transport direction of the carrier tape 1. Subsequently, as the carrier tape 1 and the antenna element are further transported, the other end portion of the seal material 4 peels off from the tape-shaped main body 3. The other end portion of the seal material 4 adheres by the adhesive force of the adhesive layer 4a to the antenna conductor 12a of the antenna element 12 transported in the direction intersecting with the transport direction of the carrier tape 1. As a result, the RFID tag 10 shown in FIG. 8 is manufactured. By sequentially performing this operation, a plurality of RFID tags 10 are able to be manufactured.

According to the method for manufacturing an RFID tag according to the first preferred embodiment, the plurality of the electronic components 2 with seal materials is housed in the carrier tape 1 and, therefore, the handleability of the plurality of the electronic components 2 with seal materials is improved. Additionally, since the seal materials 4 necessary for manufacturing the RFID tags 10 are affixed to the tape-shaped main body 3 to retain the electronic components 5, it is not necessary to provide another member that is unnecessary for manufacturing the RFID tags 10 to retain the electronic components 5 in the housing holes 3a. Moreover, since the electronic components 2 with seal materials are able to be separated from the tape-shaped main body 3 by simply folding the tape-shaped main body 3, the number of manufacturing steps and the manufacturing costs are reduced. An angle of the fold of the tape-shaped main body 3 and a degree of curvature at the folded position may be appropriately set in consideration of the adhesive force between the electronic components 2 with seal materials and the tape-shaped main body 3 and other factors.

In the method for manufacturing an RFID tag according to the first preferred embodiment, while the carrier tape 1 is continuously pulled out from the supply reel 21, the tape-shaped main body 3 of the pulled-out carrier tape 1 is folded at a certain position away from the supply reel 21. As a result, the plurality of the electronic components 2 with seal materials is sequentially separated from the tape-shaped main body 3 and sequentially affixed to the antenna conductors 12a, 12b of the antenna elements 12 pulled out from the supply reel 22. Therefore, for example, the carrier tape 1 is pulled out at a rate of several dozen meters per minute to separate the plurality of the electronic components 5 from the tape-shaped main body 3 at high speed. Consequently, a plurality of the RFID tags 10 are able to be manufactured in shorter amount of time.

Preferably, the seal materials 4 have a shape (e.g., a rectangular or substantially rectangular shape) including a longitudinal direction and a transverse direction in a planar view and, when the electronic components 2 with seal materials are each separated from the tape-shaped main body 3, a portion in the longitudinal direction of the seal material 4 is first separated. As a result, the electronic components 2 with seal materials are able to be more easily separated from the tape-shaped main body 3.

The seal materials 4 preferably have higher rigidity than the tape-shaped main body 3. As a result, when the tape-shaped main body 3 is folded, the separation of the seal materials 4 from the tape-shaped main body 3 is facilitated. Therefore, the seal materials 4 are preferably made of a material having a quality or a property associated with a larger elastic force (resilience), such as a larger Young's modulus and a greater thickness, than the tape-shaped main body 3.

The carrier tape 1 after the separation of the electronic components 2 with seal materials may be wound around a winding reel (not shown). In particular, the carrier tape 1 may preferably be transported by a roll-to-roll technique. Similarly, the antenna base materials 11 including the antenna elements 12 thereon may preferably be transported by a roll-to-roll technique.

In the example of manufacturing shown in FIGS. 10 and 11, although the electronic components 2 with seal materials separated from the tape-shaped main body 3 are directly affixed to the antenna conductors 12a, 12b, this is not a limitation of the present invention. For example, as shown in FIGS. 12 and 13, the electronic components 2 with seal materials separated from the tape-shaped main body 3 may be affixed to the antenna conductors 12a, 12b by using a conveyer 23.

More specifically, the carrier tape 1 pulled out from the supply reel 21 is folded at a certain position away from the supply reel 21 to separate the electronic component 2 with a seal material from the tape-shaped main body 3. The separated electronic component 2 with a seal material is conveyed by the conveyer 23 to the vicinity of the antenna base material 11 including the antenna element 12 thereon pulled out from the supply reel 22. As a result, the one end portion of the seal material 4 of the electronic component 2 with a seal material is affixed to the antenna conductor 12b, and the other end portion of the seal material 4 is affixed to the antenna conductor 12a. By sequentially performing this operation, a plurality of the RFID tags 10 are able to be manufactured.

According to this configuration, the adjustment of machinery is facilitated and the electronic components 2 with seal materials are able to be more accurately affixed to the antenna conductors 12a, 12b. To fold the carrier tape 1 and the antenna base materials 11, for example, rollers may be disposed at corresponding folding portions and the carrier tape 1 and the antenna base materials 11 may be transported along the rollers.

Figure 12:
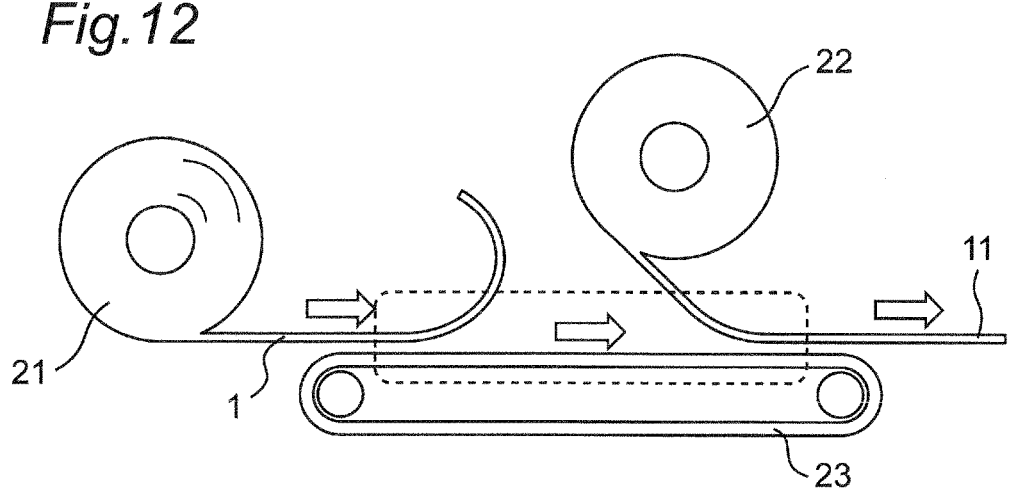
FIG. 12 is a side view of another example of the method for manufacturing a plurality of RFID tags according to a preferred embodiment of the present invention using the carrier tape of FIG. 1.
Figure 13:
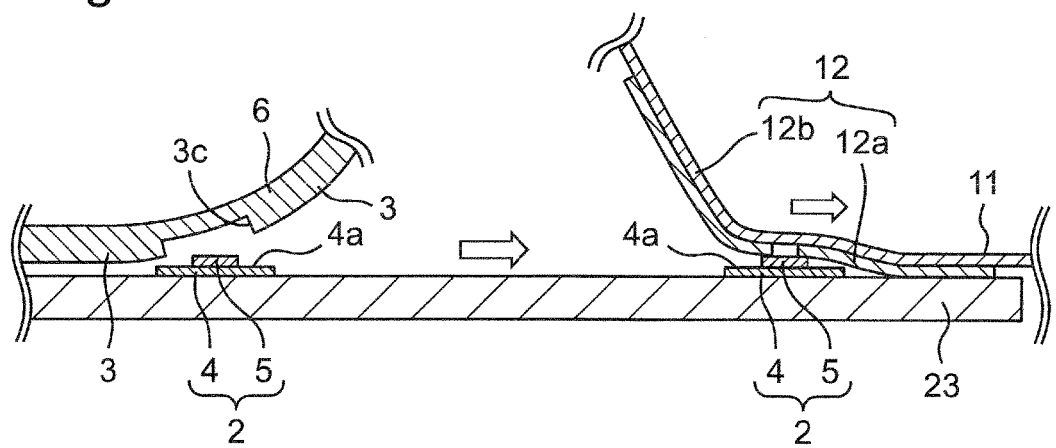
FIG. 13 is an enlarged cross-sectional view of a portion surrounded by a dotted line of FIG. 12.

The conveyer 23 may be an apparatus, such as a suction head, instead of a belt-conveyor-type apparatus as shown in FIGS. 12 and 13. In particular, the electronic component 5 with a seal material separated from the tape-shaped main body 3 may be sucked by a suction head and affixed to the antenna conductors 12a, 12b of the antenna element 12.

Description will be made of a specific configuration of an RFIC element 100 that is an example of the electronic component 5.

Figure 14:
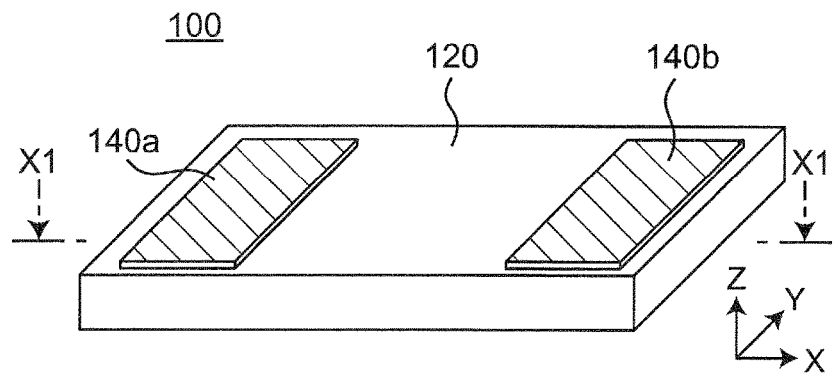
FIG. 14 is a perspective view of an RFIC element that is an example of an electronic component according to a preferred embodiment of the present invention.

FIG. 14 is a perspective view of the RFIC element 100. The RFIC element 100 is preferably an RFIC element corresponding to a communication frequency of, for example, the 900 MHz band, i.e., the UHF band. The RFIC element 100 includes a multilayer substrate 120 with a principal surface defining a rectangle or a substantial rectangle. The multilayer substrate 120 has flexibility. For example, the multilayer substrate 120 has a structure of a laminated body acquired by laminating flexible resin insulation layers of polyimide, liquid crystal polymer or other suitable materials. The insulation layers made of these materials have a permittivity that is smaller than that of ceramic base material layers represented by LTCC.

Hereinafter, for convenience of description, a longitudinal direction of the multilayer substrate 120 is indicated by an X-axis, a width direction of the multilayer substrate 120 is indicated by a Y-axis, and a thickness direction of the multilayer substrate 120 is indicated by a Z-axis.

Figure 15:
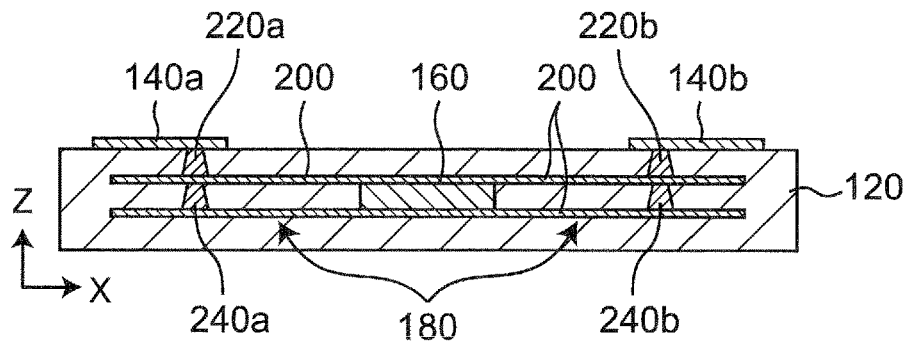
FIG. 15 is a cross-sectional view of the RFIC element shown in FIG. 14 taken along a line X1-X1.
Figure 16A:
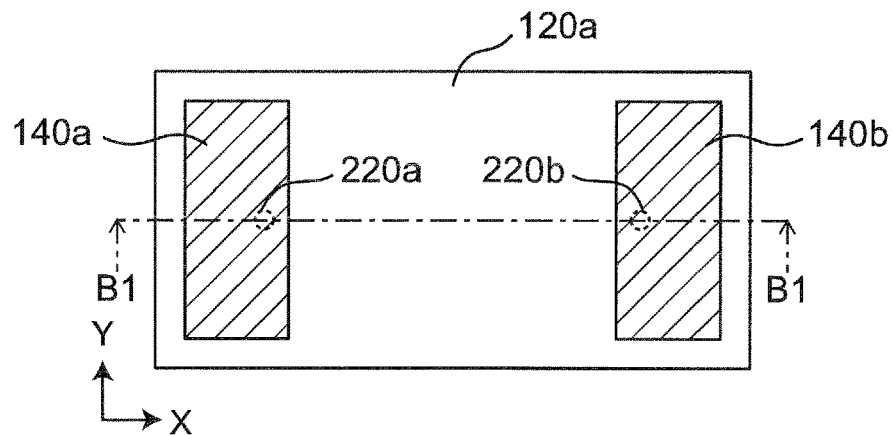
FIG. 16A is a plan view of an upper insulation layer of a multilayer substrate making up the RFIC element shown in FIG. 14 viewed from directly above.
Figure 16B:
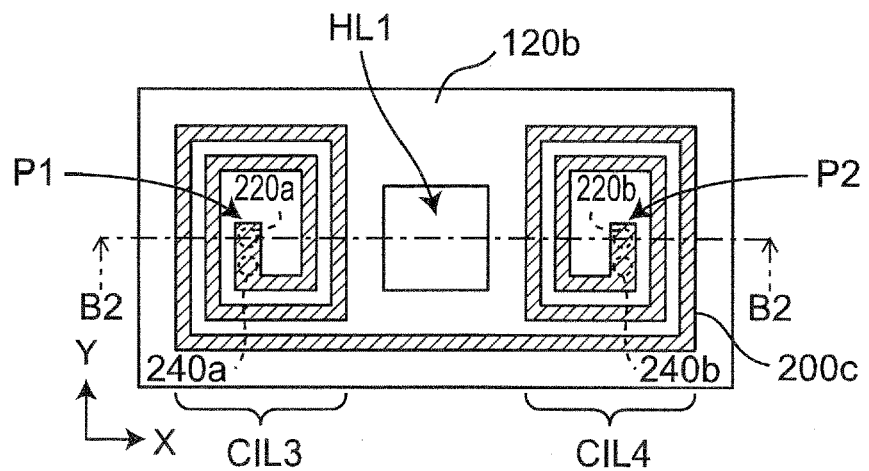
FIG. 16B is a plan view of an intermediate insulation layer of the multilayer substrate making up the RFIC element shown in FIG. 14 viewed from directly above.
Figure 16C:
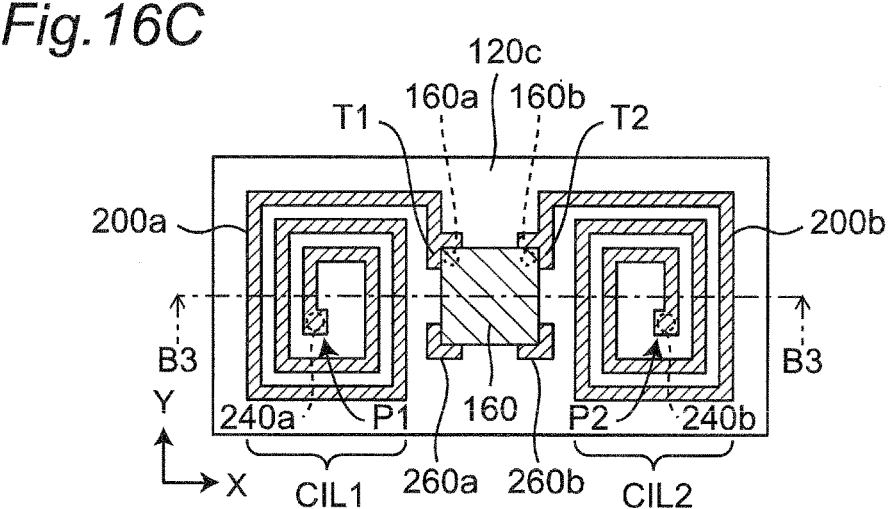
FIG. 16C is a plan view of a lower insulation layer of the multilayer substrate making up the RFIC element shown in FIG. 14 viewed from directly above.
Figure 17A:
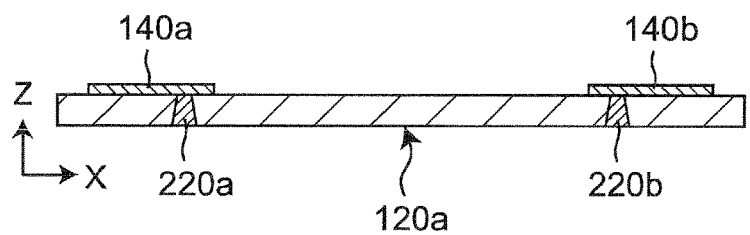
FIG. 17A is a cross-sectional view of the insulation layer shown in FIG. 16A taken along a line B1-B1.
Figure 17B:
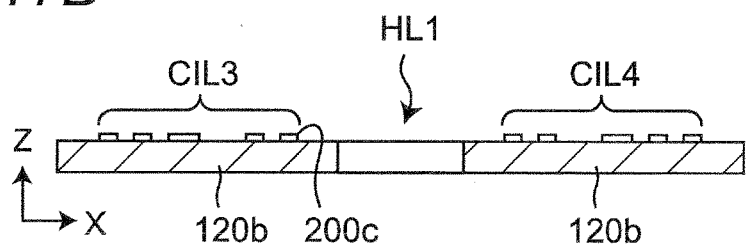
FIG. 17B is a cross-sectional view of the insulation layer shown in FIG. 16B taken along a line B2-B2.
Figure 17C:
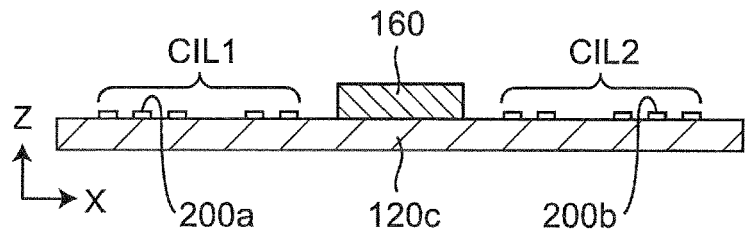
FIG. 17C is a cross-sectional view of the insulation layer shown in FIG. 16C taken along a line B3-B3.

FIG. 15 is a cross-sectional view of the RFIC element shown in FIG. 14 taken along a line X1-X1. FIG. 16A is a plan view of an upper insulation layer of the multilayer substrate 120 viewed from directly above. FIG. 16B is a plan view of an intermediate insulation layer of the multilayer substrate 120 viewed from directly above. FIG. 16C is a plan view of a lower insulation layer of the multilayer substrate 120 viewed from directly above. FIG. 17A is a cross-sectional view of the insulation layer shown in FIG. 16A taken along a line B1-B1. FIG. 17B is a cross-sectional view of the insulation layer shown in FIG. 16B taken along a line B2-B2. FIG. 17C is a cross-sectional view of the insulation layer shown in FIG. 16C taken along a line B3-B3.

As shown in FIG. 15, an RFIC chip 160 and a power feeding circuit 180 are included in the multilayer substrate 120. A first terminal electrode 140a and a second terminal electrode 140b are provided on one principal surface of the multilayer substrate 120.

The RFIC chip 160 includes various elements that are built into a hard semiconductor substrate made of a semiconductor such as silicon, for example. Both principal surfaces of the RFIC chip 160 are preferably square or substantially square, for example. As shown in FIG. 16C, a first input/output terminal 160a and a second input/output terminal 160b are provided on the other principal surface of the RFIC chip 160. The RFIC chip 160 is located at the center or approximate center in each of the X-, Y-, and Z-axes inside the multilayer substrate 120 and arranged such that the sides of the square extend along the X-axis or the Y-axis and the one principal surface and the other principal surface face the positive side and the negative side, respectively, in the Z-axis direction.

The power feeding circuit 180 includes a coil conductor 200 and interlayer connection conductors 240a, 240b. The coil conductor 200 includes coil patterns 200a to 200c shown in FIG. 16B or 16C. A portion of the coil pattern 200a includes a first coil portion CIL1. A portion of the coil pattern 200b includes a second coil portion CIL2. Portions of the coil pattern 200c include a third coil portion CIL3 and a fourth coil portion CIL4.

The first coil portion CIL1, the third coil portion CIL3, and the interlayer connection conductor 240a are arranged in the Z-axis direction at positions on the negative side in the X-axis direction. The second coil portion CIL2, the fourth coil portion CIL4, and the interlayer connection conductor 240b are arranged in the Z-axis direction at positions on the positive side in the X-axis direction.

When the multilayer substrate 120 is viewed in the Z-axis direction, the RFIC chip 160 is located between the first coil portion CIL1 and the second coil portion CIL2. When the multilayer substrate 120 is viewed in the Y-axis direction, the RFIC chip 160 is located between the third coil portion CIL3 and the fourth coil portion CIL4.

The first terminal electrode 140a is disposed at a position on the negative side in the X-axis direction. The second terminal electrode 140b is disposed at a position on the positive side in the X-axis direction. Both of the first terminal electrode 140a and the second terminal electrode 140b are preferably made of flexible copper foil having a strip shape, for example. The first terminal electrode 140a and the second terminal electrode 140b preferably have principal surface sizes that are identical or substantially identical to each other. The short sides of the first terminal electrode 140a and the second terminal electrode 140b extend in the X-axis direction. The long sides of the first terminal electrode 140a and the second terminal electrode 140b extend in the Y-axis direction.

Therefore, when the multilayer substrate 120 is viewed in the Y-axis direction, the RFIC chip 160 is interposed between a portion of the power feeding circuit 180 and another portion of the power feeding circuit 180. When the multilayer substrate 120 is viewed in the X-axis direction, the RFIC chip 160 overlaps with the power feeding circuit 180. In a planar view of the multilayer substrate 120, the power feeding circuit 180 at least partially overlaps with each of the first and second terminal electrodes 140a, 140b.

As shown in FIGS. 16A to 16C, the multilayer substrate 120 includes three laminated sheet-shaped insulation layers 120a to 120c. The insulation layer 120a is located at an upper position, the insulation layer 120b is located at an intermediate position, and the insulation layer 120c is located at a lower position.

The first terminal electrode 140a and the second terminal electrode 140b are provided on one principal surface of the insulation layer 120a. At the center or approximate center position of one principal surface of the insulation layer 120b, a rectangular or substantially rectangular through-hole HL1 is provided, which extends to the other principal surface. The through-hole HL1 preferably has a size sufficient to accommodate the RFIC chip 160 therein. The coil pattern 200c preferably having a belt shape extends around the through-hole HL1 on the one principal surface of the insulation layer 120b. The coil pattern 200c is preferably made of copper foil having flexibility.

One end portion of the coil pattern 200c is disposed at a position overlapping with the first terminal electrode 140a in the planar view and is connected to the first terminal electrode 140a by an interlayer connection conductor 220a extending in the Z-axis direction. The other end portion of the coil pattern 200c is disposed at a position overlapping with the second terminal electrode 140b in the planar view and is connected to the second terminal electrode 140b by an interlayer connection conductor 220b extending in the Z-axis direction. The interlayer connection conductors 220a, 220b include hard metal masses containing Sn as a main component.

Assuming that the one end portion of the coil pattern 200c is a starting point, the coil pattern 200c extends around the one end portion twice in the counterclockwise direction, extends to near the end portion of the negative side in the Y-axis direction, and then extends into the positive side in the X-axis direction. The coil pattern 200c bends near the end portion of the positive side in the X-axis direction toward the positive side in the Y-axis direction and extends around the other end portion twice in the counterclockwise direction before reaching the other end portion.

The coil patterns 200a, 200b preferably having a belt shape are provided on one principal surface of the insulation layer 120c. The coil patterns 200a, 200b are preferably made of copper foil having flexibility. In a planar view of the insulation layers 120b, 120c, one end portion of the coil pattern 200a is disposed at a position on the negative side in the Y-axis direction as compared to the one end portion of the coil pattern 200c. The other end portion of the coil pattern 200a (a first coil end T1) is disposed at a position overlapping with a corner portion on the negative side in the X-axis direction and the positive side in the Y-axis direction out of the four corner portions of the rectangular through-hole HL1.

One end portion of the coil pattern 200b is disposed at a position on the negative side in the Y-axis direction as compared to the other end portion of the coil pattern 200c. The other end portion of the coil pattern 200b (a second coil end T2) is disposed at a position overlapping with a corner portion on the positive side in the X-axis direction and the positive side in the Y-axis direction out of the four corner portions of the rectangular or substantially rectangular through-hole HL1. Both the first coil end T1 and the second coil end T2 are rectangular or substantially rectangular in the planar view of the insulation layer 120c.

Assuming that the one end portion of the coil pattern 200a is a starting point, the coil pattern 200a extends around the one end portion about 2.5 times, for example, in the clockwise direction and subsequently bends toward the negative side in the Y-axis direction to reach the other end portion. Similarly, assuming that the one end portion of the coil pattern 200b is a starting point, the coil pattern 200b extends around the one end portion about 2.5 times, for example, in the counterclockwise direction and subsequently bends toward the negative side in the Y-axis direction to reach the other end portion. The one end portion of the coil pattern 200a is connected to the one end portion of the coil pattern 200c by the interlayer connection conductor 240a extending in the Z-axis direction. The one end portion of the coil pattern 200b is connected to the other end portion of the coil pattern 200c by the interlayer connection conductor 240b extending in the Z-axis direction. The interlayer connection conductors 240a, 240b include hard metal masses containing Sn as a main component.

In the planar view of the insulation layers 120b, 120c, a section of the coil pattern 200a overlaps with a section of the coil pattern 200c, and a section of the coil pattern 200b overlaps with another section of the coil pattern 200c. Between the overlapping sections of the coil patterns 200a, 200c, the section of the coil pattern 200a is defined as a "first coil portion CIL1" and the section of the coil pattern 200c is defined as a "third coil portion CIL3." Between the overlapping sections of the coil patterns 200b, 200c, the section of the coil pattern 200b is defined as a "second coil portion CIL2" and the section of the coil pattern 200c is defined as a "fourth coil portion CIL4." The position of the one end portion of the coil pattern 200a or the one end portion of the coil pattern 200c is defined as a "first position P1" and the position of the one end portion of the coil pattern 200b or the other end portion of the coil pattern 200c is defined as a "second position P2."

Rectangular or substantially rectangular dummy conductors 260a, 260b are provided on the one principal surface of the insulation layer 120c. The dummy conductors 260a, 260b are preferably made of copper foil having flexibility. In the planar view of the insulation layers 120b, 120c, the dummy conductors 260a, 260b are disposed to overlap with two respective corner portions arranged in the X-axis direction on the negative side in the Y-axis direction out of the four corner portions of the rectangular or substantially rectangular through-hole HL1.

The RFIC chip 160 is mounted on the insulation layer 120c such that the four corner portions of the other principal surface respectively face the first coil end T1, the second coil end T2, and the dummy conductors 260a, 260b. The first input/output terminal 160a is disposed on the other principal surface of the RFIC chip 160 to overlap with the first coil end T1 in the planar view. Similarly, the second input/output terminal 160b is disposed on the other principal surface of the RFIC chip 160 to overlap with the second coil end T2 in the planar view.

As a result, the RFIC chip 160 is connected to the first coil end T1 by the first input/output terminal 160a and is connected to the second coil end T2 by the second input/output terminal 160b.

The thickness of the insulation layers 120a to 120c is preferably is about 10 μm or greater and about 100 μm or less, for example. Therefore, the RFIC chip 160 and the power feeding circuit 180 built into the multilayer substrate 120 can be seen through on the outside. Therefore, the connection state, i.e., presence of a broken wire, of the RFIC chip 160 and the power feeding circuit 180 is easily confirmed.

Figure 18:
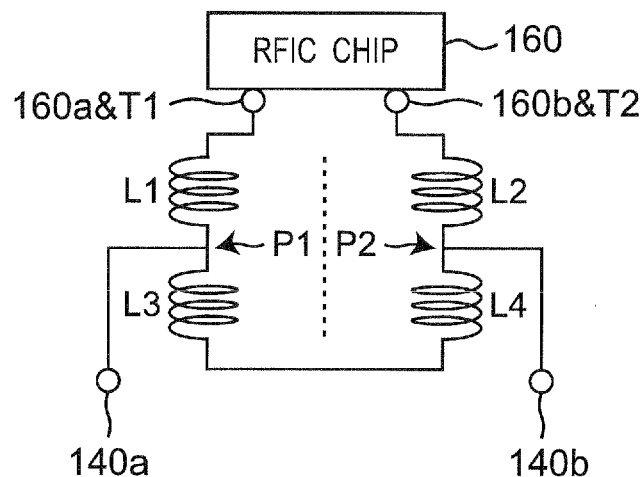
FIG. 18 is a diagram of an equivalent circuit of the RFIC element shown in FIG. 14.

FIG. 18 is a diagram of an equivalent circuit of the RFIC element 100 configured as described above. In FIG. 18, an inductor L1 corresponds to the first coil portion CIL1. An inductor L2 corresponds to the second coil portion CIL2. An inductor L3 corresponds to the third coil portion CIL3. An inductor L4 corresponds to the fourth coil portion CIL4. The impedance matching characteristics by the power feeding circuit 180 are specified by the values of the inductors L1 to L4.

One end portion of the inductor L1 is connected to the first input/output terminal 160a disposed on the RFIC chip 160. One end portion of the inductor L2 is connected to the second input/output terminal 160b disposed on the RFIC chip 160. The other end portion of the inductor L1 is connected to one end portion of the inductor L3. The other end portion of the inductor L2 is connected to one end portion of the inductor L4. The other end portion of the inductor L3 is connected to the other end portion of the inductor L4. The first terminal electrode 140a is connected to a connection point between the inductors L1, L3. The second terminal electrode 140b is connected to a connection point between the inductors L2, L4.

Figure 19:
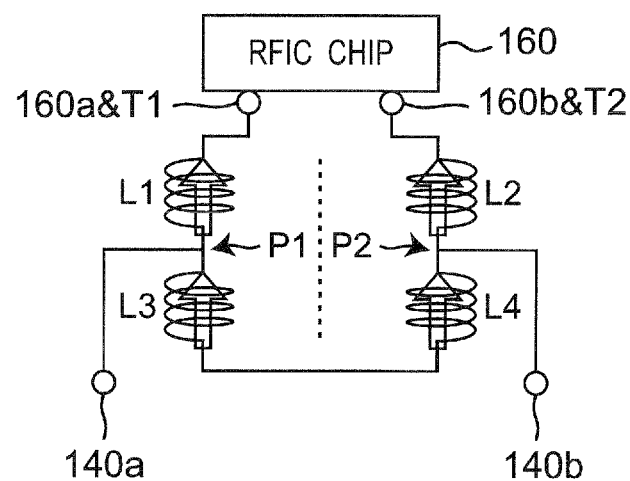
FIG. 19 is a diagram of an example of a state of a magnetic field occurring on the equivalent circuit shown in FIG. 18.

As can be seen from the equivalent circuit shown in FIG. 18, the first coil portion CIL1, the second coil portion CIL2, the third coil portion CIL3, and the fourth coil portion CIL4 are wound so as to provide magnetic fields that are in phase and are connected in series to each other. Therefore, the magnetic fields are generated towards a direction indicted by arrows of FIG. 19 at a certain point in time. On the other hand, the magnetic fields are generated towards a direction opposite to the direction indicted by the arrows of FIG. 19 at another point in time.

As can be seen from FIGS. 16B and 16C, the first coil portion CIL1 and the third coil portion CIL3 preferably have the same or substantially the same loop shape and a same first winding axis. Similarly, the second coil portion CIL2 and the fourth coil portion CIL4 preferably have the same or substantially the same loop shape and a same second winding axis. The first winding axis and the second winding axis are disposed at positions such that the RFIC chip 160 is interposed therebetween.

Therefore, the first coil portion CIL1 and the third coil portion CIL3 are magnetically and capacitively coupled. Similarly, the second coil portion CIL2 and the fourth coil portion CIL4 are magnetically and capacitively coupled.

As is understood from the description, the RFIC chip 160 includes the first input/output terminal 160a and the second input/output terminal 160b and is built into the multilayer substrate 120. The power feeding circuit 180 includes the coil patterns 200a to 200c and is built into the multilayer substrate 120. Among these, the other end portion of the coil pattern 200a (the first coil end T1) is connected to the first input/output terminal 160a, and the other end portion of the coil pattern 200b (the second coil end T2) is connected to the second input/output terminal 160b. The first terminal electrode 140a and the second terminal electrode 140b are disposed on the one principal surface of the multilayer substrate 120. The first terminal electrode 140a is connected to the one end portion of the coil pattern 200a (the first position P1). The second terminal electrode 140b is connected to the one end portion of the coil pattern 200b (the second position P2).

The first coil portion CIL1 is located in a section from the first coil end T1 to the first position P1 and includes the first winding axis in a direction intersecting with the one principal surface of the multilayer substrate 120. The second coil portion CIL2 is located in a section from the second coil end T2 to the second position P2 and includes the second winding axis in a direction intersecting with the one principal surface of the multilayer substrate 120. The third coil portion CIL3 is disposed so as to overlap with the first coil portion CIL1 in the planar view. The fourth coil portion CIL4 is disposed so as to overlap with the second coil portion CIL2 in the planar view. The first coil portion CIL1/the third coil portion CIL3 and the second coil portion CIL2/the fourth coil portion CIL4 are disposed at locations such that the RFIC chip 160 is interposed therebetween. The multilayer substrate 120 includes the power feeding circuit 180 that preforms impedance matching between the antenna element 12 and the RFIC chip 160 as well as the built-in RFIC chip 160.

The RFIC chip 160 includes the semiconductor substrate. Therefore, the RFIC chip 160 acts as a ground or as a shield for the first coil portion CIL1, the second coil portion CIL2, the third coil portion CIL3, and the fourth coil portion CIL4. Consequently, the first coil portion CIL1 and the second coil portion CIL2 as well as the third coil portion CIL3 and the fourth coil portion CIL4 are not significantly magnetically or capacitively coupled to each other. This reduces the risk of narrowing the passband of communication signals.

Figure 20:
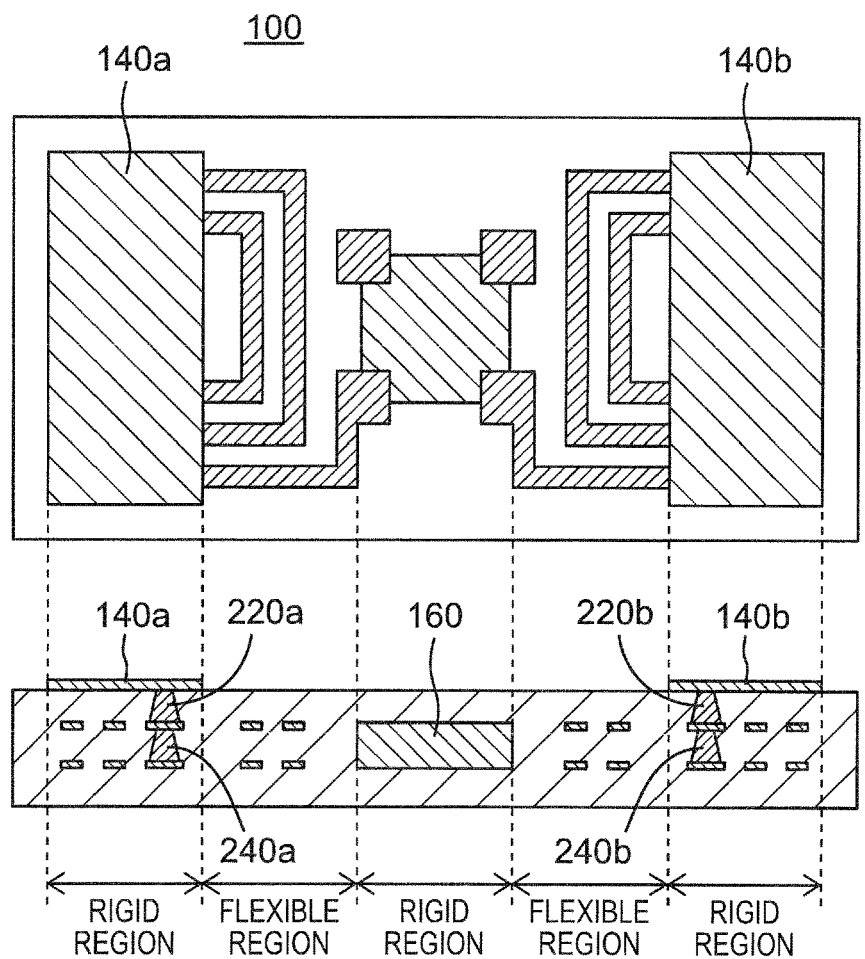
FIG. 20 is a diagram of distribution of rigid and flexible regions in the RFIC element shown in FIG. 14.
Figure 21:
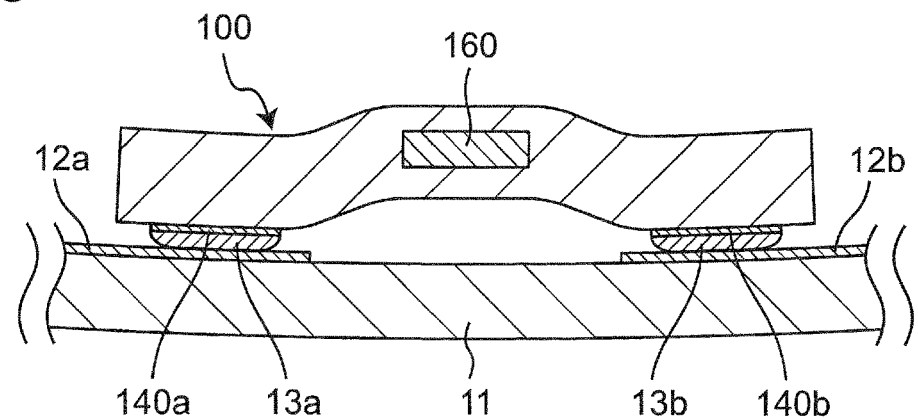
FIG. 21 is a diagram of a bent state of an RFID tag having the RFIC element shown in FIG. 14 attached to an antenna element.

An example of attaching the RFIC element 100 onto the antenna conductors 12a, 12b by conductive bonding materials 13a, 13b will be described. FIG. 20 is a diagram of the distribution of rigid and flexible regions in the RFIC element 100. FIG. 21 is a diagram of a bent state of an RFID tag including the RFIC element 100 attached to the antenna conductors 12a, 12b.

As described above, the multilayer substrate 120, the coil patterns 200a to 200c, the first terminal electrode 140a, and the second terminal electrode 140b include members having flexibility. On the other hand, the interlayer connection conductors 220a, 220b, 240a, 240b and the RFIC chip 160 include hard, rigid members. The first terminal electrode 140a and the second terminal electrode 140b have a comparatively large size and, therefore, are less flexible. If a plating film of Ni/Au or Ni/Sn is applied to the first terminal electrode 140a and the second terminal electrode 140b, the first terminal electrode 140a and the second terminal electrode 140b are further reduced in flexibility.

As a result, rigid regions and flexible regions are provided in the RFIC element 100 as shown in FIG. 20. More specifically, the regions including the first terminal electrode 140a, the second terminal electrode 140b, and the RFIC chip 160 are defined as the rigid regions, and the other regions are defined as the flexible regions. Particularly, since the first terminal electrode 140a and the second terminal electrode 140b are disposed at positions spaced away from the RFIC chip 160, the flexible regions are located between the first terminal electrode 140a and the RFIC chip 160 and between the second terminal electrode 140b and the RFIC chip 160.

Therefore, if the RFID tag including the RFIC element 100 affixed to the antenna conductors 12a, 12b of the antenna base material 11 is affixed to a curved surface, the RFIC element 100 is bent as shown in FIG. 21, for example.

Figure 22:
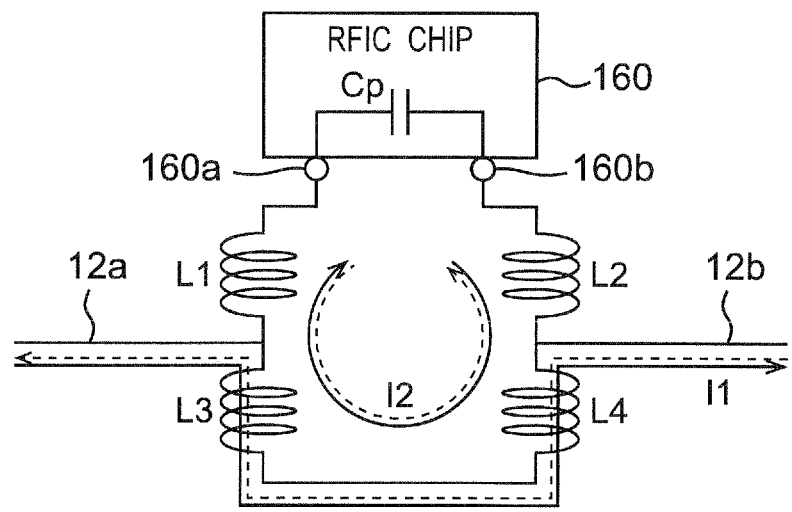
FIG. 22 is a diagram of an example in which a current flows through an equivalent circuit of the RFID tag of FIG. 21.
Figure 23:
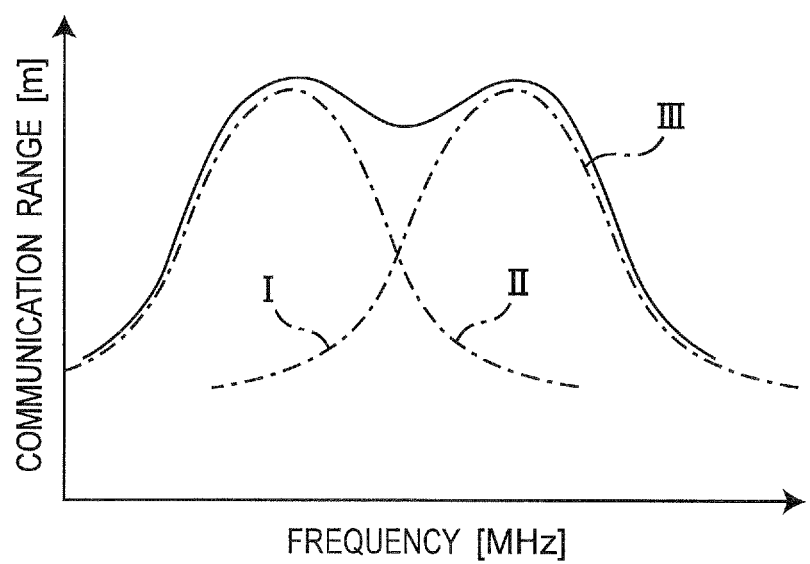
FIG. 23 is a graph of an example of resonance frequency characteristics of the RFID tag of FIG. 21.

FIG. 22 is a diagram of an example in which a current flows through an equivalent circuit of the RFID tag of FIG. 21. FIG. 23 is a graph of an example of resonance frequency characteristics of the RFID tag of FIG. 21.

As shown in FIG. 22, the RFIC chip 160 itself has a parasitic capacitance (stray capacitance) Cp between the first input/output terminal 160a and the second input/output terminal 160b. Therefore, two resonances are generated in the RFIC element 100. The first resonance is the resonance generated in a current path including the antenna conductors 12a, 12b and the inductors L3, L4. The second resonance is the resonance generated in a current path (current loop) including the inductors L1 to L4 and the parasitic capacitance Cp. These two resonances are coupled by the inductors L3 to L4 which are shared by the current paths. Two respective currents I1 and I2 corresponding to the two resonances flow as indicated by a dotted line in FIG. 22.

Both of a first resonance frequency and a second resonance frequency are affected by the inductors L3 to L4. A difference of several dozen MHz, and more specifically, about 5 MHz or more to about 50 MHz or less, for example, is generated between the first resonance frequency and the second resonance frequency. The resonance frequency characteristics thereof are represented by curves I and II in FIG. 23. By combining the two resonances having such resonance frequencies, broadband resonance frequency characteristics are produced as indicated by a curve III in FIG. 23.

Second Preferred Embodiment

Figure 24:
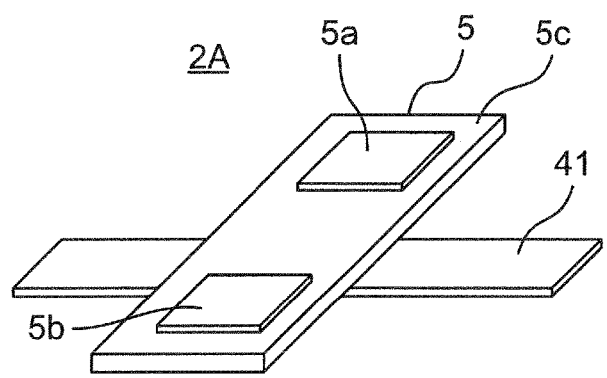
FIG. 24 is a perspective view of a general configuration of an electronic component with a seal material according to a second preferred embodiment of the present invention.
Figure 25:
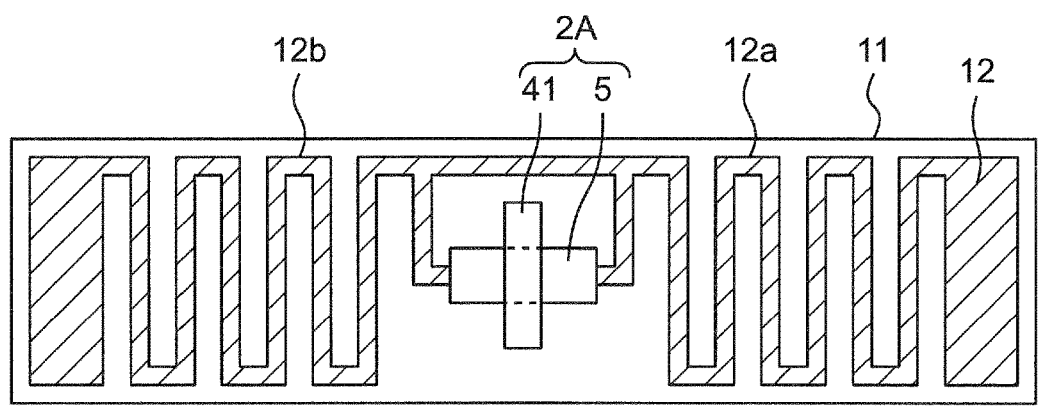
FIG. 25 is a plan view of a state of the electronic component with a seal material of FIG. 24 attached to an antenna element of an antenna base material.

FIG. 24 is a perspective view of a general configuration of an electronic component 2A with a seal material according to a second preferred embodiment of the present invention. FIG. 25 is a plan view of the electronic component 2A with a seal material of FIG. 24 attached to the antenna element 12 of the antenna base material 11. The second preferred embodiment is different from the first preferred embodiment in that a seal material 41 of the electronic component 2A with a seal material has a smaller size than the seal material 4.

As shown in FIG. 24, the seal material 41 preferably has a rectangular or substantially rectangular belt shape. The seal material 41 is attached to a portion of the fixation surface of the electronic component 5 to extend in a direction intersecting with, e.g., perpendicular or substantially perpendicular to, the longitudinal direction of the electronic component 5.

The seal material 41 also ensures the electric connection between the terminal electrodes 5a, 5b of the electronic component 5 and the antenna conductors 12a, 12b, and eliminates the need for direct fixation using ultrasonic bonding or fixation using a bonding material.

Figure 26:
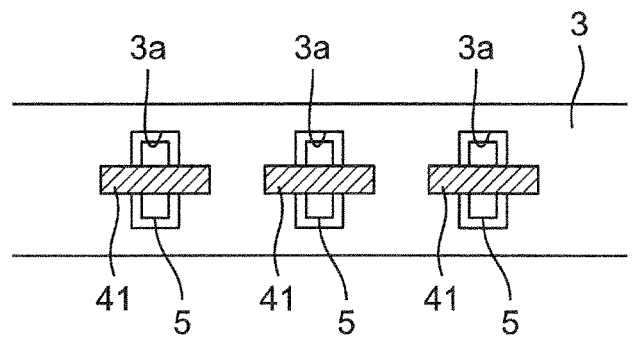
FIG. 26 is a bottom view of a state of the electronic component with a seal material of FIG. 24 in which the portions other than those defining and functioning as the seal materials are separated from a tape-shaped main body.

The seal material 41 is able to be manufactured using the manufacturing steps for the carrier tape described above with reference to FIG. 4D by forming cuts to separate a portion defining and functioning as the seal material 41 including a portion partially overlapping with each of the housing holes 3a in a planar view from the other portions. FIG. 26 is a bottom view of a state in which the portions other than those defining and functioning as the seal materials 41 are separated from the tape-shaped main body 3 after the formation of the cuts. In this case, the seal materials 41 do not completely cover the housing holes 3a, such that portions of the housing holes 3a are exposed.

Although one seal material 41 is preferably provided for each of the electronic components 5 in the second preferred embodiment, this is not a limitation of the present invention. For example, two or more seal materials 41 may be provided for each of the electronic components 5.

Third Preferred Embodiment

Figure 27:
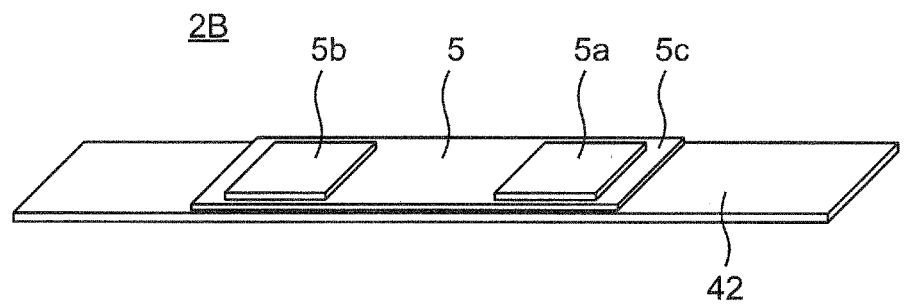
FIG. 27 is a perspective view of a general configuration of an electronic component with a seal material according to a third preferred embodiment of the present invention.
Figure 28:
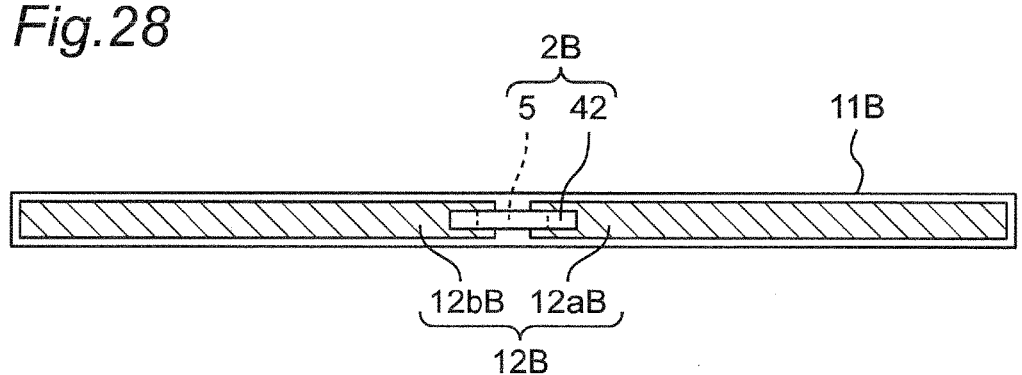
FIG. 28 is a plan view of a state of the electronic component with a seal material of FIG. 27 attached to an antenna element of an antenna base material.

FIG. 27 is a perspective view of a general configuration of an electronic component 2B with a seal material according to a third preferred embodiment of the present invention. FIG. 28 is a plan view of the electronic component 2B with a seal material of FIG. 27 attached to an antenna element 12B of an antenna base material 11B. The third preferred embodiment is different from the first preferred embodiment in that a seal material 42 of the electronic component 2B with a seal material has a smaller width than the seal material 4 and the antenna conductors 12aB, 12bB of the antenna element 12B preferably have an elongated rectangular or substantially rectangular belt shape.

As shown in FIG. 27, the seal material 42 is attached to the fixation surface of the electronic component 5 to extend in the longitudinal direction of the electronic component 5. The length of the seal material 42 in the transverse direction and the length of the electronic component 5 in the transverse direction are preferably the same or substantially the same. The seal material 42 has a length in the longitudinal direction that is longer than the length of the electronic component 5 in the longitudinal direction and is sized to protrude from both end portions of the electronic component 5 in the longitudinal direction.

The seal material 42 shaped and sized as described above also ensures the electric connection between the terminal electrodes 5a, 5b of the electronic component 5 and the antenna conductors 12a, 12b, and eliminates the need for direct fixation using ultrasonic bonding or fixation using a bonding material. Since the width of the electronic component 2B with a seal material is able to be reduced, the widths of the antenna base material 11B and the antenna conductors 12aB, 12bB of the antenna element 12B are able to be narrowed such that, for example, the component is able to be affixed to an outer circumferential surface of a circular plate-shaped disk such as a DVD.

In the third preferred embodiment, the antenna element 12B defines and functions as a dipole antenna. The antenna conductors 12aB, 12bB have common or substantially common widths and lengths. The width of the antenna conductors 12aB, 12bB is smaller than the width of the antenna base material 11B. The width of the antenna base material 11B is preferably about 1 mm, for example. The length of the antenna conductors 12aB, 12bB is preferably less than half of the length of the antenna base material 11B.

The seal material 42 is able to be manufactured in the manufacturing steps for the carrier tape described above with reference to FIG. 4D by forming cuts to separate a portion defining and functioning as the seal material 42 including a portion partially overlapping with each of the housing holes 3a in a planar view from the other portions.

Figure 29:
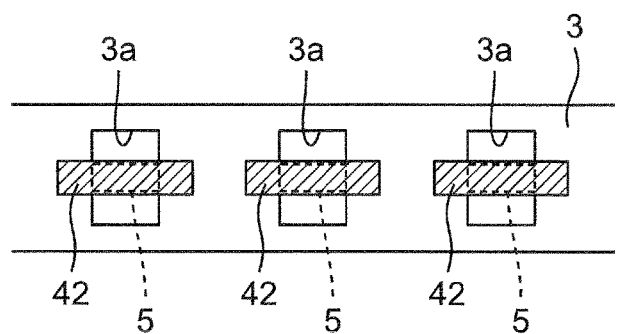
FIG. 29 is a bottom view of a state of the electronic component with a seal material of FIG. 27 in which the portions other than those defining and functioning as the seal materials are separated from the tape-shaped main body.

FIG. 29 is a bottom view of a state in which the portions other than those defining and functioning as the seal materials 42 are separated from the tape-shaped main body 3 after the formation of the cuts. In this case, the seal materials 42 do not completely cover the housing holes 3a, such that portions of the housing holes 3a are exposed.

Fourth Preferred Embodiment

Figure 30:
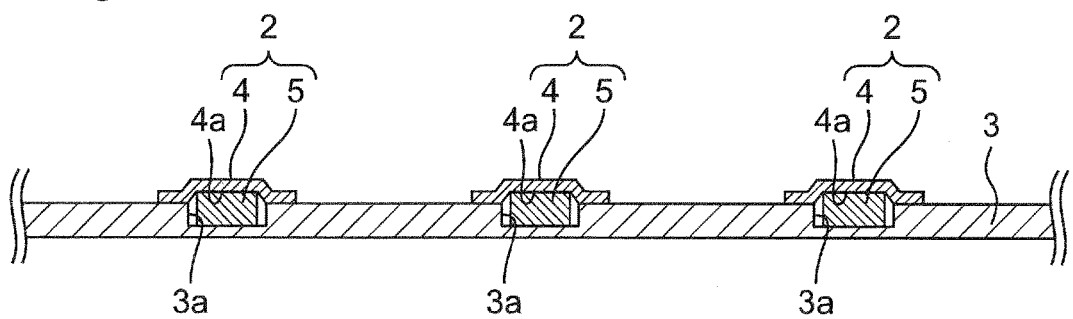
FIG. 30 is a cross-sectional view of a general configuration of a carrier tape according to a fourth preferred embodiment of the present invention.

FIG. 30 is a cross-sectional view of a general configuration of a carrier tape 1A according to a fourth preferred embodiment of the present invention. The fourth preferred embodiment is different from the first preferred embodiment in that the depth of the housing holes 3a is less than the thickness of the electronic components 5, that the electronic components 5 project upward from the housing holes 3a, and that the seal materials 4 are curved at portions corresponding to the housing holes 3a.

According to this configuration, the seal materials 4 and the electronic components 5 are able to be more certainly brought into contact with each other, and the seal materials 4 and the electronic components 5 are able to be more securely bonded through the adhesive layers 4a. If the depth of the housing holes 3a is greater than the thickness of the electronic components 5, the seal materials 4 cannot contact the electronic components 5 unless the seal materials 4 enter into the housing holes 3a. Therefore, the electronic components 5 and the seal materials 4 may be unable to be bonded to one another or the adhesive force therebetween may be reduced.

Fifth Preferred Embodiment

Figure 31:
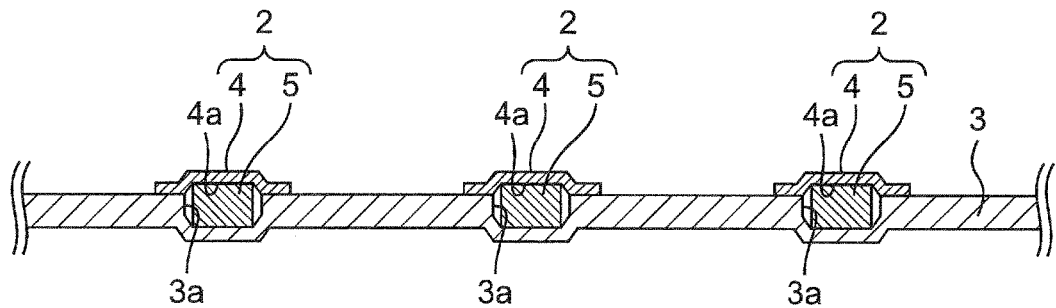
FIG. 31 is a cross-sectional view of a general configuration of a carrier tape according to a fifth preferred embodiment of the present invention.

FIG. 31 is a cross-sectional view of a general configuration of a carrier tape 1B according to a fifth preferred embodiment of the present invention. The fifth preferred embodiment is different from the first preferred embodiment in that the depth of the housing holes 3a is less than the thickness of the electronic components 5, that the electronic components 5 project upward and downward from the housing holes 3a, and that the seal materials 4 and the tape-shaped main body 3 are curved at portions corresponding to the housing holes 3a. Therefore, the tape-shaped main body 3 has an embossed tape configuration.

According to this configuration, as is the case with the fourth preferred embodiment described above, the seal materials 4 and the electronic components 5 are able to be more certainly brought into contact with each other, and the seal materials 4 and the electronic components 5 are able to be more securely bonded through the adhesive layers 4a. Since the tape-shaped main body 3 is also curved at the portions corresponding to the housing holes 3a, the pressure applied from the electronic components 5 to the seal materials 4 are reduced so that the seal materials 4 are prevented from peeling from the tape-shaped main body 3 due to the pressure.

Sixth Preferred Embodiment

Figure 32:
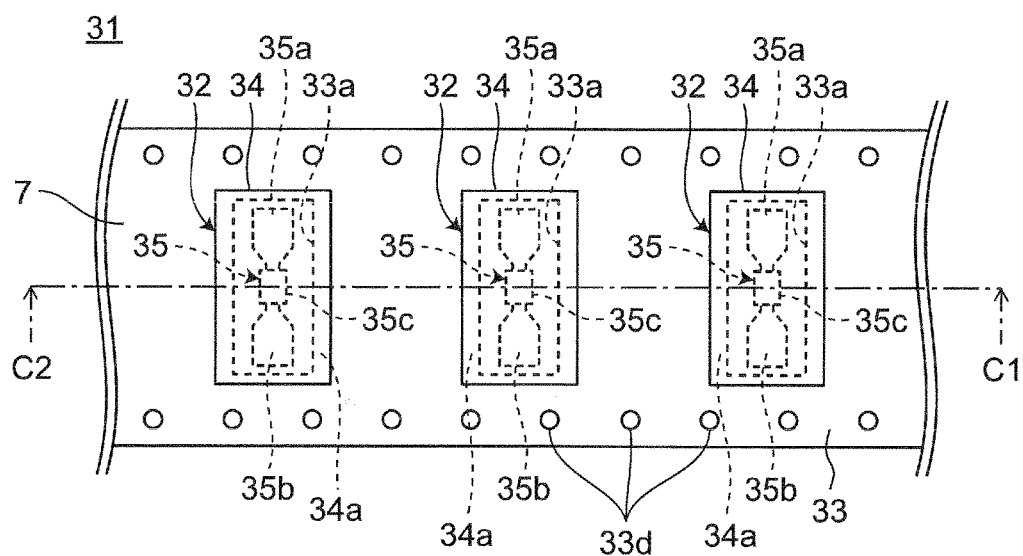
FIG. 32 is a plan view of a general configuration of a carrier tape according to a sixth preferred embodiment of the present invention.
Figure 33:
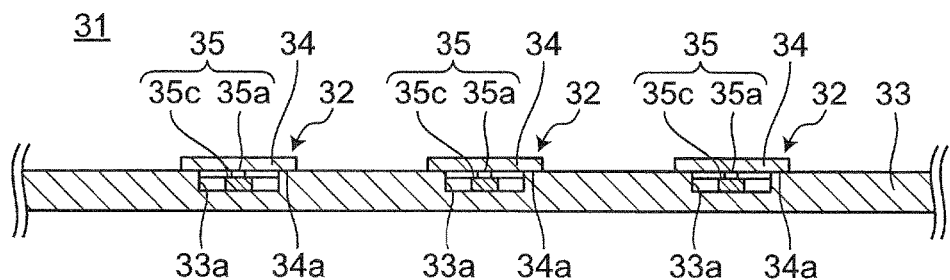
FIG. 33 is a cross-sectional view taken along a line C1-C1 of FIG. 32.
Figure 34:
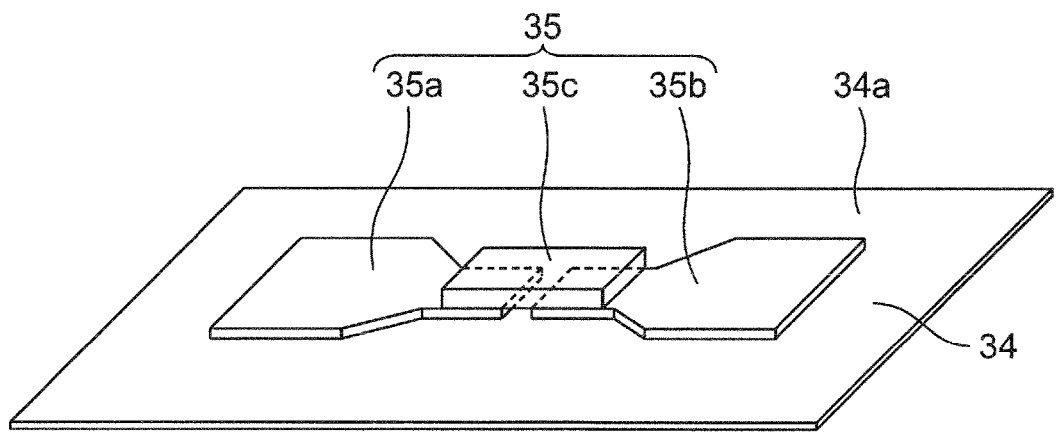
FIG. 34 is a perspective view of a general configuration of the electronic component with a seal material.

FIG. 32 is a plan view of a general configuration of a carrier tape according to a sixth preferred embodiment of the present invention. FIG. 33 is a cross-sectional view taken along a line C1-C1 of FIG. 32. FIG. 34 is a perspective view of a general configuration of the electronic component with a seal material.

As shown in FIGS. 32 and 33, a carrier tape 31 according to the sixth preferred embodiment 6 is configured to house a plurality of electronic components 32 with seal materials. More specifically, the carrier tape 31 includes a tape-shaped main body 33, a plurality of seal materials 34, and a plurality of chip-shaped electronic components 35. The electronic components 32 with seal materials include the seal materials 34 and the electronic components 35.

The tape-shaped main body 33 is preferably a belt-shaped member that includes a plurality of housing holes 33a including a bottom surface on one principal surface. The plurality of the housing holes 33a is disposed along the longitudinal direction of the tape-shaped main body 33. The arrangement intervals of the housing holes 33a are preferably equal or substantially equal intervals, for example. The housing holes 33a have a size that is slightly larger than the electronic components 35 so that the electronic components 35 are entirely housed in a planar view while a gap of about 0.1 mm to about 2 mm, for example, is preferably provided around the electronic components 5. The "planar view" in this case refers to a view in the direction shown in FIG. 32. The tape-shaped main body 33 includes a member having a heat resistance property and flexibility, for example. The thickness of the tape-shaped main body 33 is preferably about 50 μm to about 800 μm, for example. In the sixth preferred embodiment, the depth of the housing holes 33a is the same or substantially the same as the thickness of the electronic components 35 or shallower than the thickness of the electronic components 35. Both end portions in the width direction of the tape-shaped main body 3 are provided with a plurality of feed holes 33d along the longitudinal direction of the tape-shaped main body 33. Suction holes may be provided for temporarily sucking and fixing the electronic components 35 until the electronic components 35 are fixed by the seal materials 34 after disposing the electronic components 35 in the bottom portions of the housing holes 33a.

The seal materials 34 are each affixed to, for example, an antenna base material 51, described later, to retain electrical connection between an antenna element 52 that is an example of a connection object, and the electronic component 35. Each of the seal materials 34 includes an adhesive layer 34a on one principal surface. The adhesive layer 34a is preferably provided on the entire or substantially the entire one principal surface of the seal material 34, for example. The seal materials 34 are affixed to one principal surface of the tape-shaped main body 33 such that the adhesive layers 34a are exposed in the housing holes 33a. The one principal surface of the tape-shaped main body 33 is subjected to a release treatment. In the sixth preferred embodiment, the seal materials 34 preferably have a larger size than the housing holes 33a so as to completely cover the housing holes 33a. The seal materials 34 preferably include members having a heat resistance property, flexibility, and elasticity, such as polyimide, for example. The thickness of the seal materials 34 is preferably about 20 μm to about 200 μm, for example.

The electronic components 35 are housed in the housing holes 33a and bonded to the adhesive layers 34a of the seal materials 34. As shown in FIG. 34, each of the electronic components 35 includes a pair of terminal electrodes 35a, 35b. The pair of the terminal electrodes 35a, 35b electrically connects a chip-shaped main body 35c of the electronic component 35 and the antenna element 52, and is fixed to the chip-shaped main body 35c of the electronic component 35 and bonded to the adhesive layer 34a. The pair of the terminal electrodes 35a, 35b is preferably made of, for example, copper foil, so that the electrodes are bonded with solder to the chip-shaped main body 35c of the electronic component 35. The one terminal electrode 35a and the other terminal electrode 35b are arranged so as to face each other with a gap therebetween. For example, the electronic component 35 is able to be manufactured by punching a hoop material to form a pair of the terminal electrodes 35a, 35b and by soldering the chip-shaped main body 35c straddling the end portions facing each other of the pair of the terminal electrodes 35a, 35b before removal from the hoop material.

In the sixth preferred embodiment, the chip-shaped main bodies 35c of the electronic components 35 are preferably RFIC elements, such as packages or straps with RFIC chips sealed therein, for example. The RFIC elements are preferably ultrathin packages, for example. The height (thickness) of the RFIC elements is preferably about 50 μm to about 1 mm, for example.

In the carrier tape according to the sixth preferred embodiment, the plurality of the electronic components 32 with seal materials is housed in the carrier tape 31 and, therefore, the handleability of the plurality of the electronic components 32 with seal materials is improved. Additionally, since the seal materials 34 for manufacturing RFID tags are affixed to the tape-shaped main body 33 to retain the electronic components 35, it is not necessary to provide another member that is unnecessary for manufacturing RFID tags to retain the electronic components 35 in the housing holes 33a. Therefore, the number manufacturing steps and the manufacturing costs are reduced.

Although the chip-shaped main bodies 35c of the electronic components 35 are RFIC elements in the sixth preferred embodiment, this is not a limitation of the present invention. If the electronic components 32 with seal materials are used for a purpose other than the manufacturing of RFID tags, the chip-shaped main bodies 35c of the electronic components 35 may be components other than the RFIC elements. For example, the chip-shaped main bodies 35c of the electronic components 35 may be sensor components, such as temperature sensors and acceleration sensors. In this case, a plurality of sensor components with seal materials may be housed in a carrier tape, and the carrier tape may be used for affixing the sensor components with seal materials to articles that are an example of the connection object such as a carrying case. As a result, the plurality of the sensor components is mounted on articles at high speed.

Although the adhesive layer 34a is provided on the entire or substantially the entire one principal surface of the seal material 34 in the sixth preferred embodiment, this is not a limitation of the present invention. The adhesive layer 34a may be dispersedly or intermittently disposed at necessary positions on the one principal surface of the seal material 34.

Figure 35:
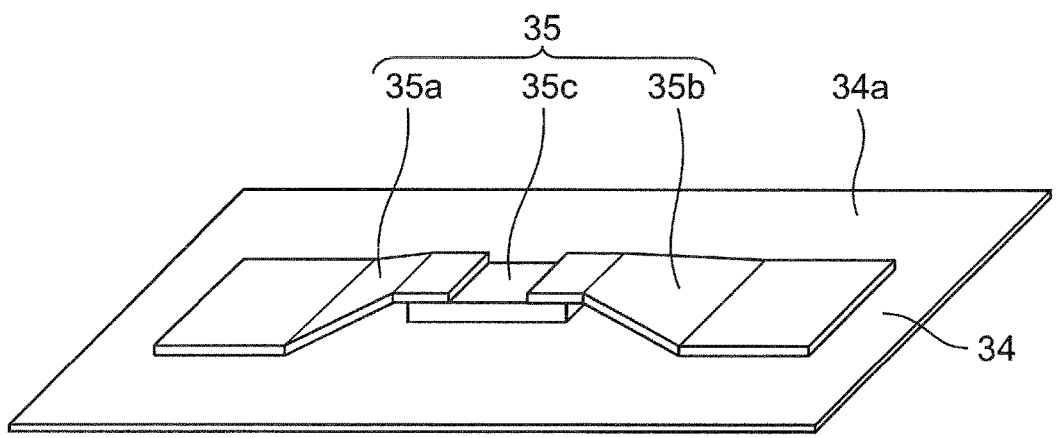
FIG. 35 is a perspective view of a general configuration of a modification example of the electronic component with a seal material.

Although a pair of the terminal electrodes 35a, 35b is provided on the adhesive layer 34a of the seal material 34 and the chip-shaped main body 35c is provided on the pair of the terminal electrodes 35a, 35b in the sixth preferred embodiment, this is not a limitation of the present invention. For example, as shown in FIG. 35, the chip-shaped main body 35c may be provided on the adhesive layer 34a of the seal material 34, and a pair of the terminal electrodes 35a, 35b may be provided to straddle a principal surface of the chip-shaped main body 35c and the adhesive layer 34a.

A method for manufacturing a carrier tape according to the sixth preferred embodiment will be described. FIGS. 36A to 36E are perspective views of a non-limiting example of the method for manufacturing a carrier tape according to the sixth preferred embodiment.

Figure 36A:
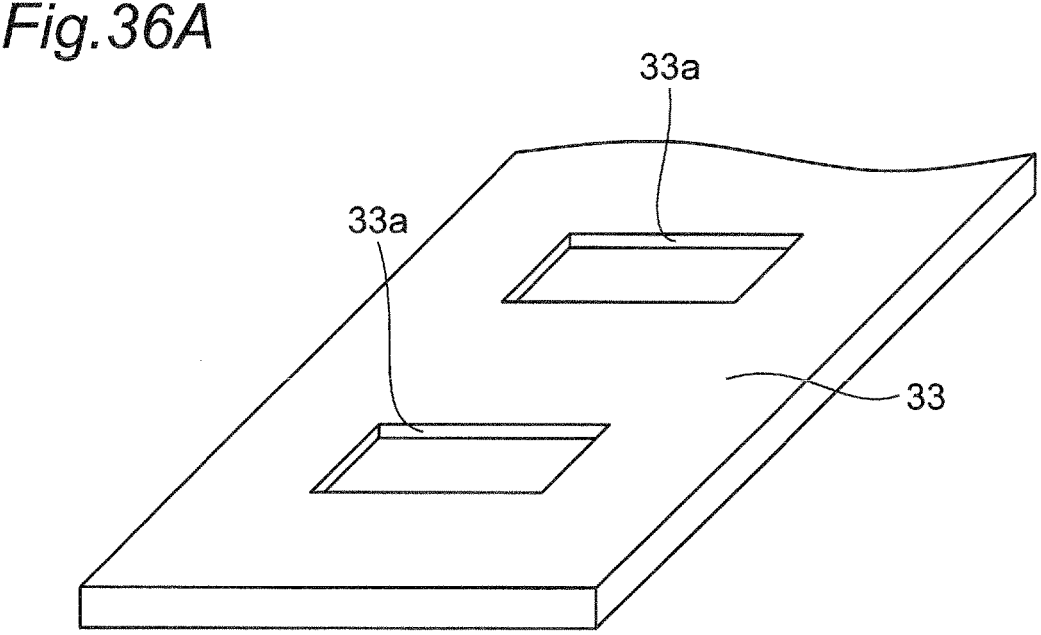
FIG. 36A is a perspective view of an example of a method for manufacturing the carrier tape according to the sixth preferred embodiment of the present invention.

First, as shown in FIG. 36A, the tape-shaped main body including a plurality of the housing holes 33a along a longitudinal direction is prepared.

Figure 36B:
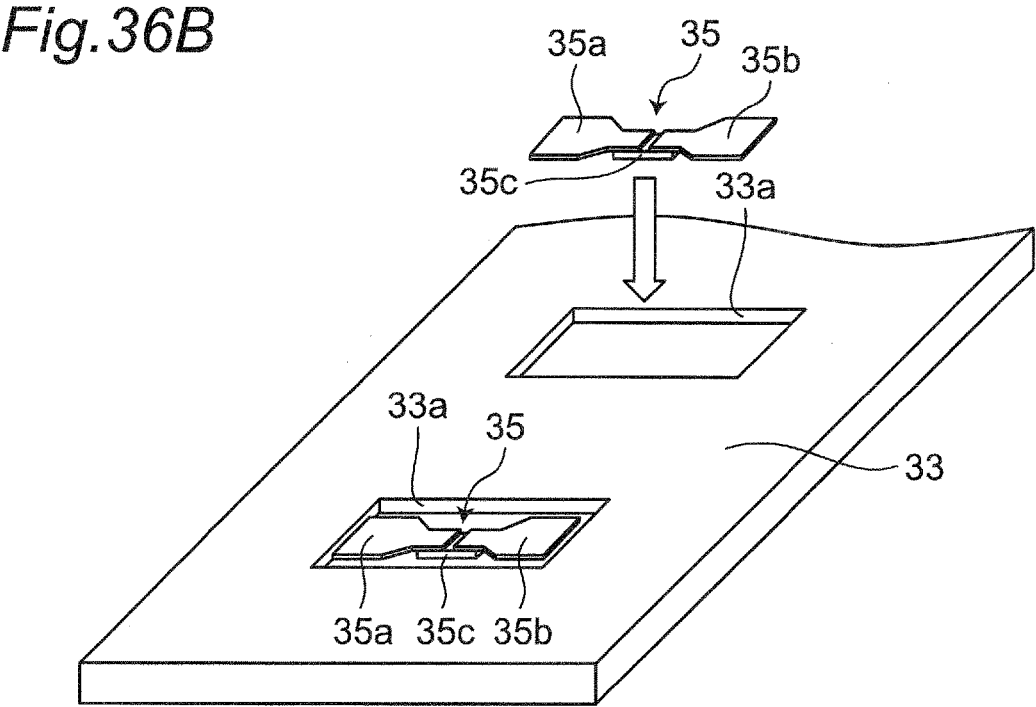
FIG. 36B is a perspective view of a step continued from FIG. 36A.

As shown in FIG. 36B, the electronic components 35 are respectively housed in the plurality of the housing holes 33a of the tape-shaped main body 33.

Figure 36C:
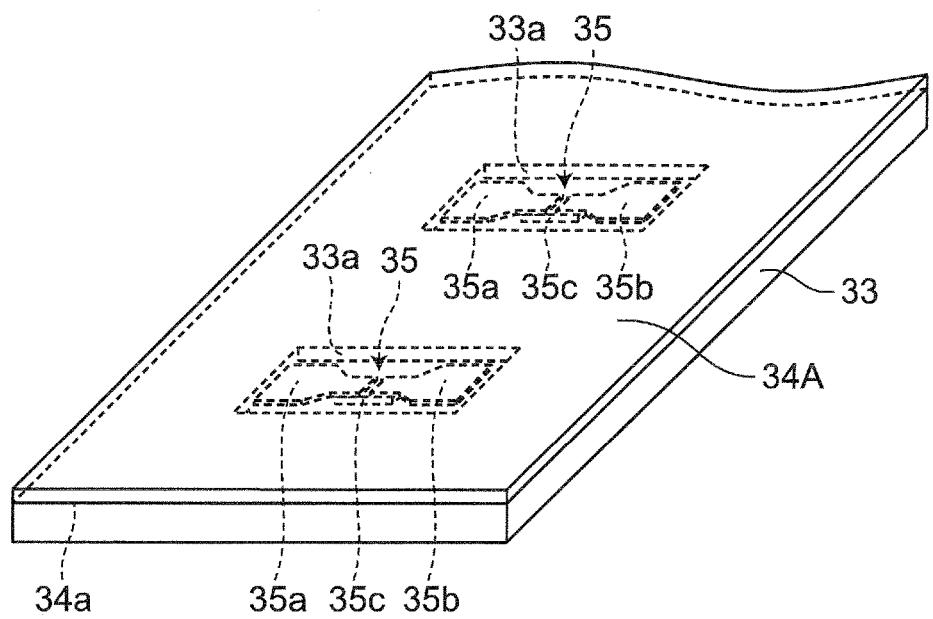
FIG. 36C is a perspective view of a step continued from FIG. 36B.

As shown in FIG. 36C, a tape-shaped seal material 34A including the adhesive layer 34a on one principal surface is affixed to the tape-shaped main body 33 such that the adhesive layer 34a covers the housing holes 33a and adheres to pairs of the terminal electrodes 35a, 35b of the electronic components 35.

Figure 36D:
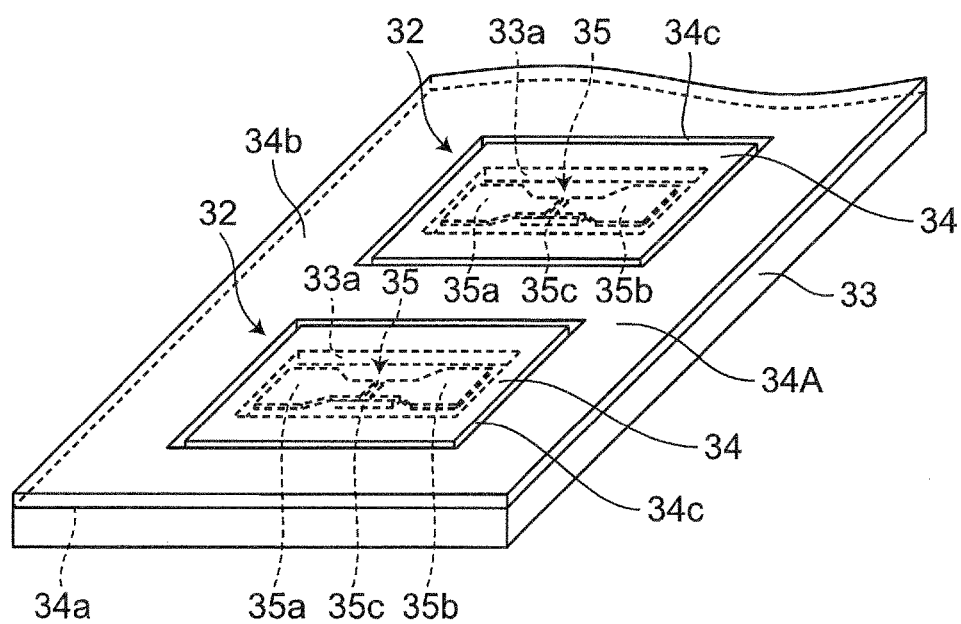
FIG. 36D is a perspective view of a step continued from FIG. 36C.

As shown in FIG. 36D, cuts 34c are formed in the tape-shaped seal material 34A to separate portions thereof that define and function as the seal materials 34 including portions overlapping with the respective housing holes 33a in a planar view from the other portions 34b. In this case, the cuts 34c are formed to penetrate the tape-shaped seal material 34A and reach the one principal surface of the tape-shaped main body 33.

Figure 36E:
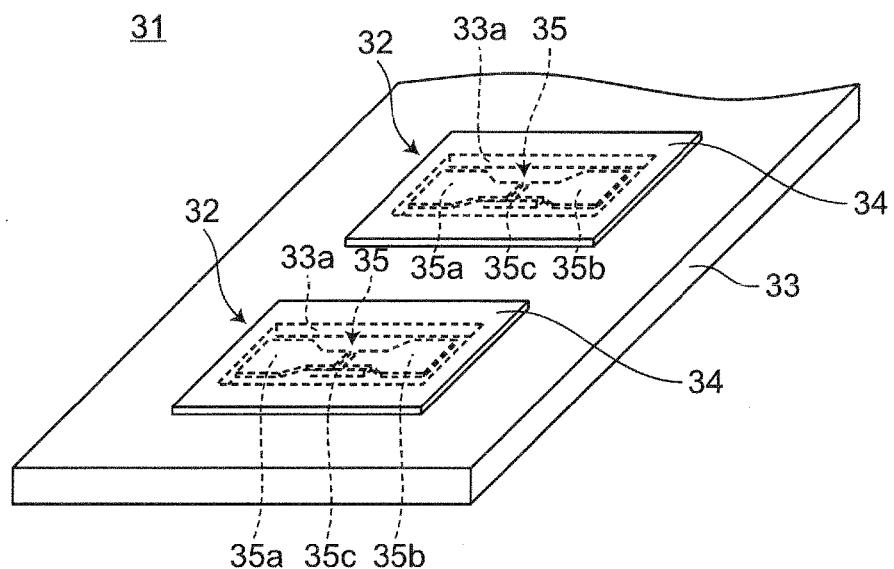
FIG. 36E is a perspective view of a step continued from FIG. 36D.

As shown in FIG. 36E, the other portions 34b are separated from the tape-shaped main body 33. The other portions 34b are connected in the longitudinal direction of the tape-shaped seal material 34A and, therefore, are able to be sequentially peeled off from the tape-shaped main body 33.

According to the method for manufacturing a carrier tape according to the sixth preferred embodiment, the plurality of the electronic components 32 with seal materials is housed in the carrier tape 31 and, therefore, the handleability of the plurality of the electronic components 32 with seal materials is improved. Additionally, since the seal materials 34 necessary for manufacturing RFID tags are affixed to the tape-shaped main body 33 to retain the electronic components 35, it is not necessary to provide another member that is unnecessary for manufacturing RFID tags to retain the electronic components 35 in the housing holes 33a. Therefore, the number of manufacturing steps and the manufacturing costs are reduced.

In a method for manufacturing a carrier tape according to the sixth preferred embodiment, the cuts 34c are formed in the tape-shaped seal material 34A before separating the portions 34b other than those defining and functioning as the seal materials 34 from the tape-shaped main body 33. As a result, when the electronic components 32 with seal materials are separated from the tape-shaped main body 33, the electronic components 32 with seal materials are separated after the portions 34b other than those defining and functioning as the seal materials 34 are removed, and therefore are able to be easily separated.

Although after the cuts 34c are formed in the tape-shaped seal material 34A, the portions 34b other than those defining and functioning as the seal materials 34 are separated from the tape-shaped main body 33 in the sixth preferred embodiment, this is not a limitation of the present invention. The adhesion between the other portions 34b and the tape-shaped main body 33, the size of the cuts 34c, and other factors may be adjusted such that when the electronic components 32 with seal materials are separated from the tape-shaped main body 33, the separation is not prevented by the portions 34b other than those defining and functioning as the seal materials 34. This eliminates the need to separate the other portions 34b from the tape-shaped main body 33.

Figure 37:
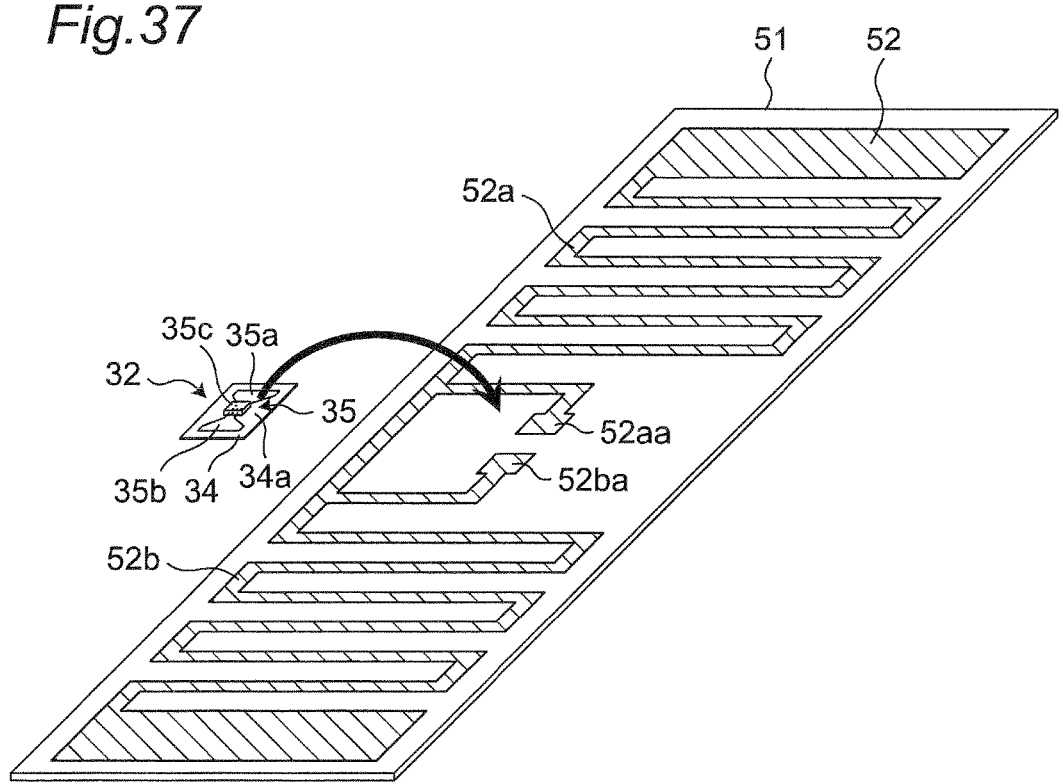
FIG. 37 is a perspective view of a method for manufacturing an RFID tag according to a preferred embodiment of the present invention.
Figure 38:
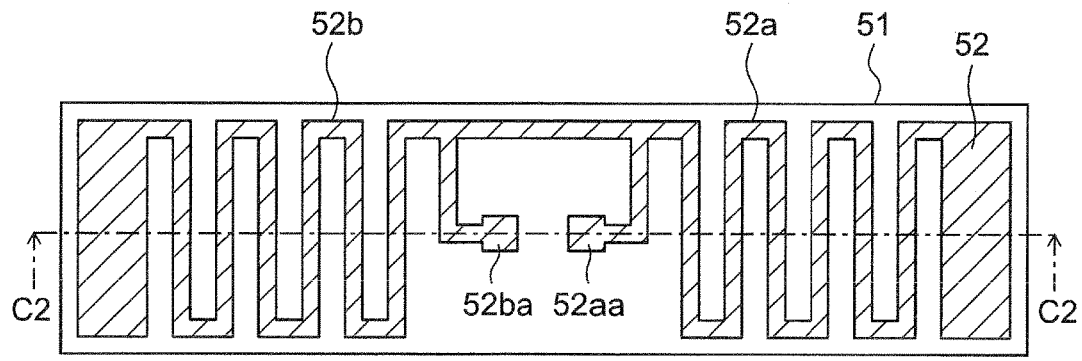
FIG. 38 is a plan view of an antenna material and an antenna element that are components of the RFID tag.
Figure 39:
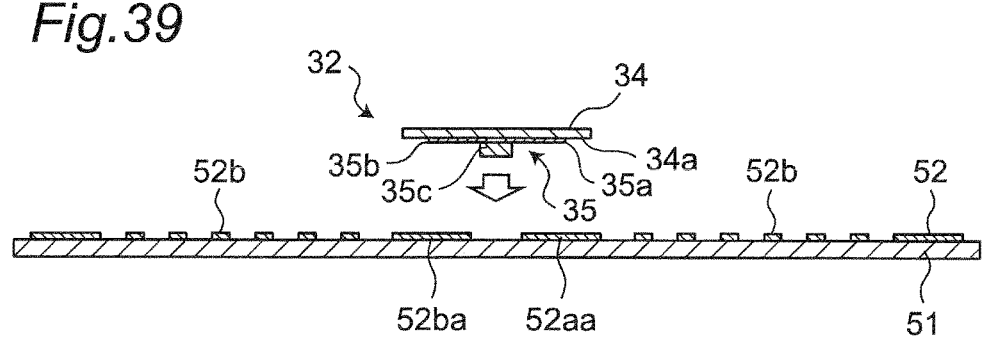
FIG. 39 is a cross-sectional view taken along a line C2-C2 of FIG. 38.
Figure 40:
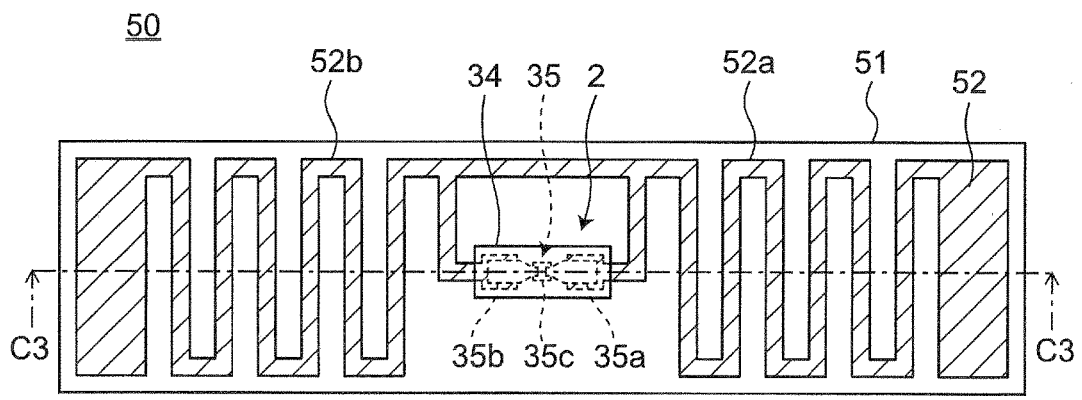
FIG. 40 is a plan view of a state in which the electronic component with a seal material is attached onto the antenna element.
Figure 41:
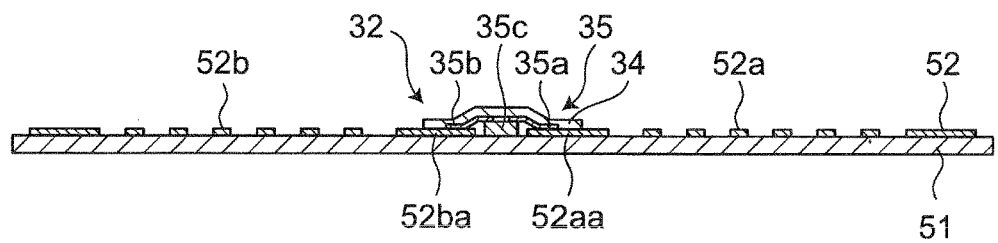
FIG. 41 is a cross-sectional view taken along a line C3-C3 of FIG. 40.

A method for manufacturing an RFID tag 50 according to a preferred embodiment of the present invention using the electronic component 32 with a seal material (RFIC element 32 with a seal material) will be described. FIG. 37 is a perspective view of the method for manufacturing the RFID tag 50. FIG. 38 is a plan view of the antenna base material 51 and the antenna element 52 that are components of the RFID tag 50. FIG. 39 is a cross-sectional view taken along a line C2-C2 of FIG. 38. FIG. 40 is a plan view of a state in which the electronic component 32 with a seal material is attached onto the antenna element 52. FIG. 41 is a cross-sectional view taken along a line C3-C3 of FIG. 40.

As shown in FIGS. 37 to 41, the RFID tag 40 is manufactured by attaching the electronic component 32 with a seal material to the antenna element 52 provided on one principal surface of the antenna base material 51. Preferably, the RFID tag 50 is, for example, an RFID tag using the 900 MHz band as a communication frequency.

The antenna base material 51 is preferably made of a flexible material, such as polyethylene terephthalate (PET) and paper, for example. One principal surface is provided with the antenna element 52 preferably made of copper foil or aluminum foil or silver paste, for example.

The antenna element 52 includes antenna conductors 52*a*, 52*b* having a meandering shape, for example, and acting as a dipole antenna. A first end portion 52*aa* and a second end portion 52*ba* are an end portion of the antenna conductor 52*a* and an end portion of the antenna conductor 52*b*, respectively, and are spaced away from each other. An interval between the first end portion 52*aa* and the second end portion 52*ba* is preferably identical or substantially identical to an interval of a pair of the terminal electrodes 35*a*, 35*b*.

The seal material 34 of the electronic component 32 with a seal material is affixed by the adhesive layer 34*a* to the antenna base material 51 such that the first end portion 52*aa* and the second end portion 52*ba* are brought into contact with the one terminal electrode 35*a* and the other terminal electrode 35*b*, respectively. As a result, the RFID tag 50 is completed as shown in FIGS. 40 and 41. In this case, the first end portion 52*aa* and the one terminal electrode 35*a* as well as the second end portion 52*ba* and the other terminal electrode 35*b* are brought into direct contact with each other without the adhesive layer 34*a* therebetween.

Figure 42:
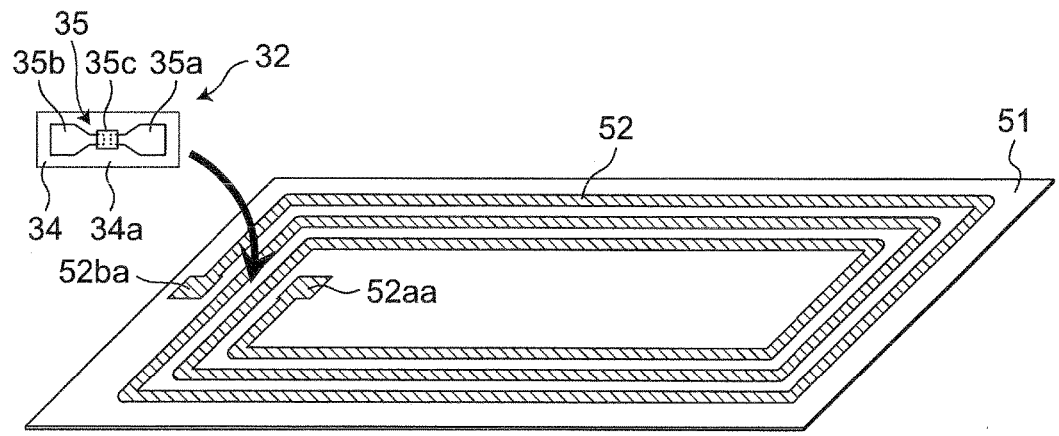
FIG. 42 is a perspective view of a modification example of the method for manufacturing an RFID tag according to a preferred embodiment of the present invention.

Although the antenna conductors 52*a*, 52*b* preferably have a meandering shape in the sixth preferred embodiment, this is not a limitation of the present invention. The antenna conductors 52*a*, 52*b* may have, for example, a rectangular or substantially belt shape or other suitable shapes. Although the antenna conductors 52*a*, 52*b* define and function as a dipole antenna, this is not a limitation of the present invention. The antenna conductors 52*a*, 52*b* may define and function as a loop type antenna or may define and function as other types of antennas. The antenna element 52 may define and function as a spiral-shaped antenna as shown in FIG. 42. In this case, for example, the antenna element 52 may be covered with a resist film except for the first end portion 52*aa* and the second end portion 52*ba*, so as to connect the first end portion 52*aa* and the one terminal electrode 35*a* as well as the second end portion 52*ba* and the other terminal electrode 35*b* to each other.

Figure 43:
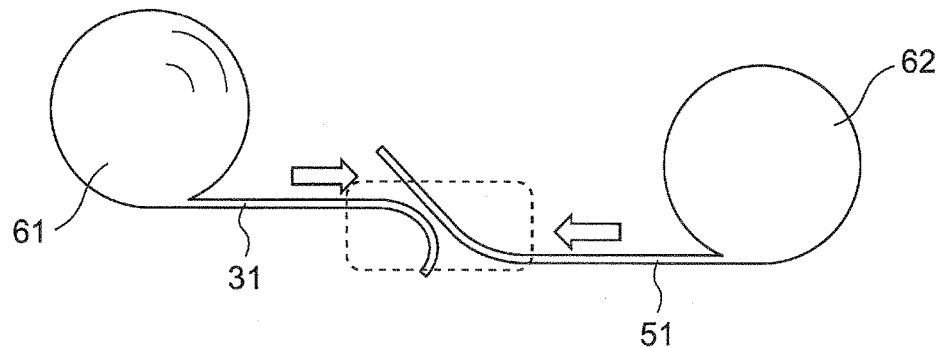
FIG. 43 is a side view of an example of a method for manufacturing a plurality of RFID tags according to a preferred embodiment of the present invention using the carrier tape of FIG. 32.
Figure 44:
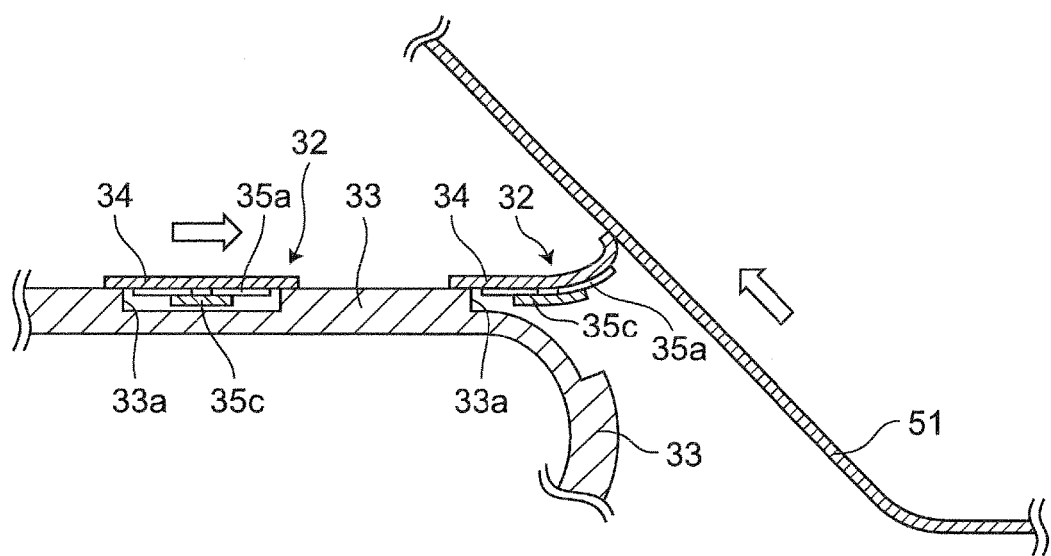
FIG. 44 is an enlarged cross-sectional view of a portion surrounded by a dotted line of FIG. 43.

A method for manufacturing a plurality of the RFID tags 50 according to a preferred embodiment of the present invention using the carrier tape 31 will be described. FIG. 43 is a side view of an example of the method for manufacturing a plurality of the RFID tags 50 by using the carrier tape 31. FIG. 44 is an enlarged cross-sectional view of a portion surrounded by a dotted line of FIG. 43.

First, as shown in FIG. 43, a supply reel 61 is prepared with the carrier tape 31 wound therearound. A plurality of the antenna base materials 51 including the antenna elements 52 thereon as shown in FIG. 38 is connected in series and into a tape shape such that the sides in the longitudinal direction are connected to each other, and a supply reel 62 is prepared with the plurality of the antenna base materials 51 wound therearound.

The carrier tape 31 is continuously pulled out from the supply reel 61 while pulling out the antenna base materials 51 including the antenna elements 52 thereon from the supply reel 62, and the carrier tape 31 and the antenna base materials 51 are brought into close proximity to each other.

As shown in FIG. 44, the tape-shaped main body 33 of the carrier tape 31 is folded (bent) in the vicinity of the antenna base materials 51 to separate the electronic component 32 with a seal material from the tape-shaped main body 33. At the time of separation, while the electronic component 32 with a seal material is being separated from the tape-shaped main body 33, a pair of the terminal electrodes 35*a*, 35*b* of the electronic component 32 with a seal material is connected to the first terminal 52*aa* and the second terminal 52*ba* of the antenna element 52 (see FIG. 41) transported in the direction intersecting with the transport direction of the carrier tape 31.

More specifically, by folding the tape-shaped main body of the carrier tape 31 in the vicinity of the antenna base materials 51, one end portion of the seal material 34 first peels off from the tape-shaped main body 33. The one end portion of the seal material 34 adheres by the adhesive force of the adhesive layer 34*a* to the antenna base material 51 transported in the direction intersecting with the transport direction of the carrier tape 31. Subsequently, as the carrier tape 31 and the antenna base material 51 move further, the pair of the terminal electrodes 35*a*, 35*b* is connected to the first terminal 52*aa* and the second terminal 52*ba* of the antenna element 52 (see FIG. 41). Subsequently, as the carrier tape 31 and the antenna base material 51 move further, the other end portion of the seal material 34 peels off from the tape-shaped main body 33. The other end portion of the seal material 34 adheres by the adhesive force of the adhesive layer 34*a* to the antenna base material 51 transported in the direction intersecting with the transport direction of the carrier tape 31. As a result, the RFID tag 50 shown in FIGS. 40 and 41 is manufactured. By sequentially performing this operation, a plurality of RFID tags 50 is able to be manufactured.

With the method for manufacturing an RFID tag according to the sixth preferred embodiment, the plurality of the electronic components 32 with seal materials is housed in the carrier tape 31 and, therefore, the handleability of the plurality of the electronic components 32 with seal materials is improved. Additionally, since the seal materials 34 necessary for manufacturing the RFID tags 50 are affixed to the tape-shaped main body 33 to retain the electronic components 35, it is not necessary to provide another member that is unnecessary for manufacturing the RFID tags 50 to retain the electronic components 35 in the housing holes 33*a*. Moreover, since the electronic components 32 with seal materials are separated from the tape-shaped main body 33 by simply folding the tape-shaped main body 33, the number of manufacturing steps and the manufacturing costs are reduced. An angle of the fold of the tape-shaped main body 33 and a degree of curvature at the folded position may appropriately be set in consideration of the adhesive force between the electronic components 32 with seal materials and the tape-shaped main body 33 etc.

With to the method for manufacturing an RFID tag according to the sixth preferred embodiment, while the carrier tape 31 is continuously pulled out from the supply reel 61, the tape-shaped main body 33 of the pulled-out carrier tape 31 is folded at a certain position away from the supply reel 61. As a result, the plurality of the electronic components 32 with seal materials is sequentially separated from the tape-shaped main body 33 and sequentially affixed to the antenna base materials 51 pulled out from the supply reel 62. Therefore, for example, the carrier tape 31 is pulled out at a rate of several dozen meters per minute to separate the plurality of the electronic components 35 from the tape-shaped main body 33 at high speed. Consequently, a plurality of the RFID tags 50 are able to be manufactured in shorter time.

Preferably, the seal materials 34 have a shape, e.g., a rectangular shape, having a longitudinal direction and a transverse direction in a planar view and, when the electronic components 32 with seal materials are each separated from the tape-shaped main body 33, a portion in the longitudinal direction of the seal material 34 is first separated. As a result, the electronic components 32 with seal materials are able to be more easily separated from the tape-shaped main body 33.

The seal materials 34 preferably have a higher rigidity than the tape-shaped main body 33. As a result, when the tape-shaped main body 33 is folded, the separation of the seal materials 34 from the tape-shaped main body 33 is facilitated. Therefore, the seal materials 34 are preferably made of a material having a quality or property associated with a larger elastic force (resilience), such as a larger Young's modulus and a greater thickness, than the tape-shaped main body 33.

After the separation of the electronic components 32 with seal materials, the carrier tape 31 may be wound around a winding reel (not shown). In particular, the carrier tape 31 may preferably be transported by a roll-to-roll technique. Similarly, the antenna base materials 51 including the antenna elements 52 provided thereon may preferably be transported by a roll-to-roll technique.

In the example of manufacturing shown in FIGS. 43 and 44, the electronic components 32 with seal materials separated from the tape-shaped main body 33 are directly affixed to the antenna base materials 51, this is not a limitation of the present invention. For example, as shown in FIGS. 45 and 46, the electronic components 32 with seal materials separated from the tape-shaped main body 33 may be affixed to the antenna base materials 51 using a conveyer 63.

More specifically, the carrier tape 31 pulled out from the supply reel 61 is folded at a certain position spaced away from the supply reel 61 to separate the electronic component 32 with a seal material from the tape-shaped main body 33. The separated electronic component 32 with a seal material is conveyed by the conveyer 63 to the vicinity of the antenna base material 51 including the antenna element 52 thereon pulled out from the supply reel 62. As a result, the electronic component 32 with a seal material is affixed to the antenna base material 51 pulled out from the supply reel 62 such that a pair of the terminal electrodes 35a, 35b is connected to the first terminal 52aa and the second terminal 52ba. By sequentially performing this operation, a plurality of the RFID tags 50 are able to be manufactured.

According to this configuration, the adjustment of machinery is facilitated and the electronic components 32 with seal materials are able to be more accurately affixed to the antenna base materials 51. To fold the carrier tape 31 and the antenna base materials 51, for example, rollers may be disposed at corresponding folding portions and the carrier tape 31 and the antenna base materials 51 may be transported along or around the rollers.

Figure 45:
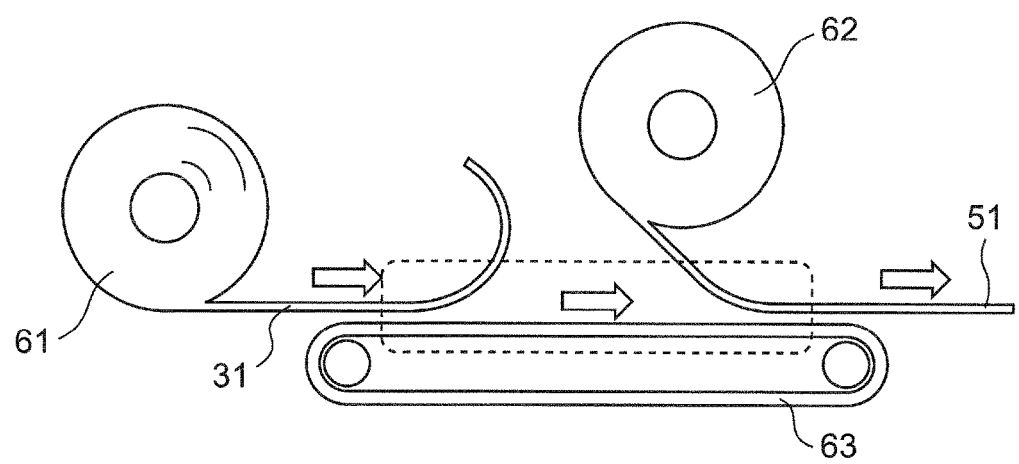
FIG. 45 is a side view of another example of the method for manufacturing a plurality of RFID tags according to a preferred embodiment of the present invention using the carrier tape of FIG. 32.
Figure 46:
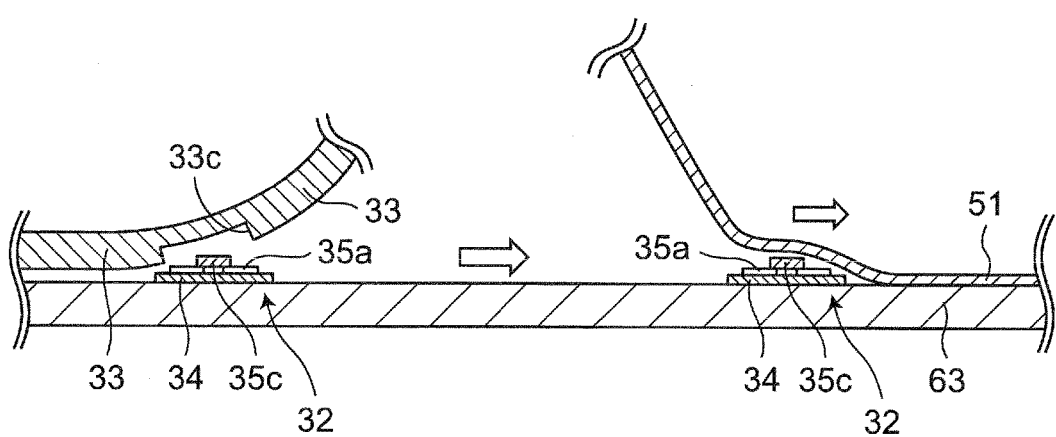
FIG. 46 is an enlarged cross-sectional view of a portion surrounded by a dotted line of FIG. 45.

The conveyer 63 may be an apparatus, such as a suction head, instead of a belt-conveyor apparatus as shown in FIGS. 45 and 46. In particular, the electronic component 35 with a seal material separated from the tape-shaped main body 33 may be sucked by a suction head and affixed to the antenna base material 51.

The preferred embodiments of the present invention are illustrative and the constituent elements described in the different preferred embodiments can be partially replaced or combined. In the second and later preferred embodiments, the details common to the first preferred embodiment are not described and only the differences are described. Particularly, the same actions and effects of the same constituent elements are not repeatedly mentioned for each of the preferred embodiments.

Since the handleability of the electronic components with seal materials is improved, preferred embodiments of the present invention are useful for manufacturing of RFID tags, a carrier tape used in the manufacturing, and a method for manufacturing the same.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing an RFID tag comprising the steps of:
   preparing a carrier tape including a plurality of RFIC elements with seal materials, the RFIC elements with seal materials including a tape-shaped main body, a plurality of chip-shaped RFIC elements, and a plurality of seal materials affixed to the tape-shaped main body such that each of the RFIC elements is covered by an adhesive layer provided on one principal surface of the seal material;
   folding the tape-shaped main body to separate each of the RFIC elements with seal materials from the tape-shaped main body; and
   continuously affixing the separated RFIC element with a seal material to an antenna base material with a plurality of antenna elements.

2. The method for manufacturing an RFID tag according to claim 1, wherein
   the carrier tape is wound around a supply reel; and
   while the carrier tape is continuously pulled out from the supply reel, the tape-shaped main body of the pulled-out carrier tape is folded at a location away from the supply reel to sequentially separate the plurality of the RFIC elements with seal materials from the tape-shaped main body.

3. The method for manufacturing an RFID tag according to claim 1, wherein
   the seal materials extend in a longitudinal direction and a transverse direction in a planar view;
   when each of the RFIC elements with seal materials is separated from the tape-shaped main body, a portion in the longitudinal direction of the seal material is separated first.

4. The method for manufacturing an RFID tag according to claim 1, wherein
   the RFIC elements each include a pair of terminal electrodes and are each adhered through the pair of the terminal electrodes to the adhesive layer of the seal material;

when the RFIC elements with seal materials are each affixed to the antenna base material, a portion of each of the pair of the terminal electrodes is connected to an antenna conductor provided on the antenna base material.

5. The method for manufacturing an RFIC tag according to claim 1, wherein
the RFIC element with the seal materials separated from the carrier tape is directly affixed to the antenna base material.

6. An apparatus for manufacturing an RFID tag comprising:
a carrier tape including a plurality of RFIC elements with seal materials, the RFIC elements with seal materials including a tape-shaped main body, a plurality of chip-shaped RFIC elements, and a plurality of seal materials affixed to the tape-shaped main body such that each of the RFIC elements is covered by an adhesive layer provided on one principal surface of the seal material;
a separation mechanism folding the tape-shaped main body to separate each of the RFIC elements with seal materials from the tape-shaped main body; and
an affixing mechanism continuously affixing the separated RFIC element with a seal material to an antenna base material with a plurality of antenna elements.

7. The apparatus for manufacturing an RFID tag according to claim 6, further comprising:
a supply reel around which the carrier tape is wound; wherein
the separation mechanism is configured so that, while the carrier tape is continuously pulled out from the supply reel, the tape-shaped main body of the pulled-out carrier tape is folded at a location away from the supply reel to sequentially separate the plurality of the RFIC elements with seal materials from the tape-shaped main body.

8. The apparatus for manufacturing an RFID tag according to claim 6, wherein
the seal materials extend in a longitudinal direction and a transverse direction in a planar view;
the separation mechanism is configured so that, when each of the RFIC elements with seal materials is separated from the tape-shaped main body, a portion in the longitudinal direction of the seal material is separated first.

9. The apparatus for manufacturing an RFID tag according to claim 6, wherein
the RFIC elements each include a pair of terminal electrodes and are each adhered through the pair of the terminal electrodes to the adhesive layer of the seal material;
the affixing mechanism is configured to affix each of the RFIC elements with seal materials to the antenna base material, so that a portion of each of the pair of the terminal electrodes is connected to an antenna conductor provided on the antenna base material.

10. The apparatus for manufacturing an RFIC tag according to claim 6, wherein
the affixing mechanism is configured to directly affix the RFIC element with the seal materials separated from the carrier tape to the antenna base material.

* * * * *